United States Patent [19]

Bentson et al.

[11] Patent Number: 5,444,842
[45] Date of Patent: Aug. 22, 1995

[54] METHOD AND APPARATUS FOR DISPLAYING AND UPDATING STRUCTURED INFORMATION

[76] Inventors: Sheridan Bentson; William R. Rassman, both of c/o DataView Partners, 5699 Kanan Rd., Suite 253, Agoura, Calif. 91301

[21] Appl. No.: 918,604

[22] Filed: Jul. 24, 1992

[51] Int. Cl.⁶ ............................................ G06F 17/30
[52] U.S. Cl. ..................... 395/161; 395/155
[58] Field of Search .............. 395/155, 161, 160, 140, 395/157; 364/222.81, 222.82, 222.83

[56] References Cited

U.S. PATENT DOCUMENTS

| | | | |
|---|---|---|---|
| 4,627,019 | 12/1986 | Ng | 364/920 |
| 4,774,661 | 9/1988 | Kumpati | 364/222.82 |
| 4,791,561 | 12/1988 | Huber | 364/222.82 |
| 4,805,099 | 2/1989 | Huber | 364/222.81 |
| 4,833,597 | 5/1989 | Wakayama et al. | 364/225 |
| 4,845,624 | 7/1989 | Clayton et al. | 364/222.81 |
| 4,893,232 | 1/1990 | Shimaoka et al. | 364/282.1 |
| 4,918,593 | 4/1990 | Huber | 364/222.81 |
| 4,928,247 | 11/1990 | Doyle et al. | 395/161 X |
| 4,930,071 | 5/1990 | Tou et al. | 364/274.3 |
| 4,939,689 | 7/1990 | Davis et al. | 364/920 |
| 5,122,972 | 6/1992 | Richard et al. | 395/157 |
| 5,247,611 | 9/1993 | Norden-Paul et al. | 395/161 |
| 5,278,951 | 1/1994 | Camacho et al. | 395/140 |

OTHER PUBLICATIONS

Microsoft Word (Trademark of Microsoft Corporation), 1991, pp. 1-9.

*Primary Examiner*—Mark K. Zimmerman
*Assistant Examiner*—Cliff N. Vo
*Attorney, Agent, or Firm*—Fitzpatrick, Cella, Harper & Scinto

[57] ABSTRACT

A system for displaying structured information such that the information is filtered and displayed mixed with structural indicators. Plural interrelated tables, which form the structured information, are stored such that each of the tables includes at least one join field which links that table to at least one other of the plural tables. Two kinds of maps are stored: a structural map and plural display maps. The structural map is based on the join fields in the plural tables and describe interrelationships and pathing among the plural tables. Each of the plural display maps corresponds to one user-selectable display of information from the plural tables and defines the manner and placement of information on display means. Each display map includes an information display part which designates how information from the tables is to be displayed, with at least some of the display maps including a structural display part which designates when structural indicators rather than information is to be displayed. Information from the plural tables is displayed mixed with structural indicators in accordance with a user selection of one or more of the plural display maps and in accordance with the information display part and the structural display part. In addition to this mixed display of structure and information, when information is displayed the information is filtered in accordance with the interrelationships and pathing defined in the structural map such that not all information designated in the information display part is necessarily displayed.

52 Claims, 31 Drawing Sheets

FIG. 4(a)

```
         DOCTORS WINDOW
DOCTOR            DEPT                  TIMES    GRPS   DR SUBST
Adams, Brian      Radiology,InPat  )*            *      Radiology,Gen   )**
Baker, John       Radiology,InPat  ))*   TimesWin1  *   Radiology,Gen   ))*
Conrad, Jeremy    Surgery,InPat    )             *      Surgery,Gen     )
Daniels, Charles  Surgery,OutPat         TimesWin1  *   Podiatry
Egan, Andrew      Radiology,InPat  )*    TimesWin1  *   Radiology,Neuro
Farmer, Jason     Radiology,InPat  ))    TimesWin1  *   Radiology,GI    )*
Gardner, Peter    Surgery,InPat    )     TimesWin1  *   Surgery,Gen
Hanson, Torvald   Surgery,OutPat         TimesWin1  *   Surgery,Emerg
```

FIG. 4(b)

```
         DOCTORS WINDOW
DOCTOR            DEPT                  TIMES    GRPS   DR SUBST
Adams, Brian..... Radiology,InPat  )*    TimesWin1  *   Radiology,Gen
Baker, John..... .Radiology,InPat  ))    TimesWin1  *   Radiology,Neuro
Conrad, Jeremy    Radiology,OutPat       TimesWin1  *   Radiology,GI
Daniels, Charles  Surgery,OutPat   )*    TimesWin1  *   Radiology,Emerg
Egan, Andrew      Radiology,InPat        TimesWin1  *   Radiology,Teach
Farmer, Jason     Radiology,InPat  )**   TimesWin1  *   Radiology,GI    )*
Gardner, Peter    Surgery,InPat    )     TimesWin1  *   Surgery,Gen
Hanson, Torvald   Surgery,OutPat         TimesWin1  *   Surgery,Emerg
```

FIG. 4(c)

```
              DOCTORS WINDOW
DOCTOR           DEPT                  TIMES GRPS     DR SUBST
Adams, Brian     Radiology,InPat  )*   TimesWin1  *   Radiology,Gen
Baker, John      Radiology,InPat       TimesWin1  *   Radiology,Neuro
Conrad, Jeremy   Radiology,OutPat
Daniels, Charles Surgery,OutPat  )*    GROUP      DEPT          TIMES
Egan, Andrew     Radiology,InPat       RedIn      InPat  Surg   Tue 14:00-16:00  *
Farmer, Jason    Radiology,InPat  )**  ZZZout     OutPat Surg   Wed 13:30-16:00  )*
Gardner, Peter   Surgery,InPat         BlueOut    OutPat Surg   MWF 09:00-12:00  )*
Hanson, Torvald  Surgery,OutPat        TimesWin1  *             Surgery,Gen
                                       TimesWin1  *             Surgery,Emerg
```

FIG. 4(d)

```
              DOCTORS WINDOW
DOCTOR           DEPT                  TIMES GRPS     DR SUBST
Adams, Brian     Radiology,InPat  )*   TimesWin1  *   Radiology,Gen
Baker, John      Radiology,InPat       TimesWin1  *   Radiology,Neuro
Conrad, Jeremy   Radiology,OutPat
Daniels, Charles Surgery,OutPat  )*    GROUP      DEPT          TIMES
Egan, Andrew     Radiology,InPat       RedIn      InPat  Surg   Tue 14:00-16:00  *
Farmer, Jason    Radiology,InPat  )**  ZZZout     OutPat Surg   Thu 13:30-15:00
Gardner, Peter   Surgery,InPat         BlueOut    OutPat Surg   MWF 09:00-12:00
Hanson, Torvald  Surgery,OutPat        TimesWin1  *             Surgery,Gen
                                       TimesWin1  *             Surgery,Emerg
```

```
TableEquivDef
{
        mdmaster.mdnum
        mdDept.mdserial
        substCross.mdserial
        timesCross.docserial
}

TableEquivDef
{
        deptTbl.dept_no
        mdDept.dept_no
        timesGrps.dept_no
}

TableEquivDef
{
        substGrps.subgrpnum
        substCross.sgserial
}

TableEquivDef
{
        timesGrps.tgserial
        timesCross.times_id
        timeSets.times_id
}

TableEquivDef
{
        timeSets.tspan_id
        timeSpan.tspan_id
}
```

FIG. 6

| FIGURE 7(a)-1 |
| FIGURE 7(a)-2 |
| FIGURE 7(a)-3 |

FIG. 7(a)

```
BaseDef      MdDef           ~210
{
    Table    mdmaster.mdnum
    Md_Id    REG  "Soc Sec"        6 Char  mdmaster.mdnum.md_ss
    Md_Lname REG  "LAST"          15 Char  mdmaster.mdnum.md_Lname    ~211
    Md_Fname REG  "FIRST"         12 Char  mdmaster.mdnum.md_Fname
    Md_Name  REGCOMP "DOCTOR" 30 Char #
             mdmaster.mdnum.(md_Lname) ", " (md_Fname)

Md_Dept  POP  "DEPT"          20 Char #                           ~212
             mdDept.mdserial.dept_no -> deptTbl.dept_no.dept_desc Md_Subst POP  "DR SUBST"      25 Char #
             substCross.mdserial.sgserial -> substGrps.subgrpnum.sg_desc Md_TGrps POPWIN                                                   ~215
    {
        Base   TimesDef
        Title  "TimesWin1"
        Filter (timesCross.docserial.times_id)                        ~214
        Layout Tm_Grp, Tm_Dept, Tm_Time
    }
}
```

FIG. 7(a)-1

```
BaseDef TimesDef
{
    Table   timesGrps.tgserial
    Tm_Grp    REG    "GROUP"   12 Char  timesGrps.tgserial.times_desc
    Tm_Dept   REG    "DEPT"    12 Char  #
             timesGrps.tgserial.dept_no -> deptTbl.dept_no.dept_desc
    Tm_Time  POPCOMP "TIMES"   18 Char  #
             timesSets.times_id.times_span ->  #
                 timesSpan.tspan_id.(tspan_day)  #
             " " (tspan_start) "-" (tspan_end)
    Tm_Md    POP    "DOCTORS"  20 Char  #
             timesCross.times_id.mdserial -> mdmaster.mdnum.md_Lname
    Tm_DocWin3 POPWIN    //gets all doctors in the times group
    {
        Base  MdDef
        Title "DocWin3"
        Filter (timesCross.times_id.mdserial)
        Layout Md_Lname, Md_Dept
    }
    Tm_DocWin4 POPWIN    //gets doctors by (given) department
    {
        Base  MdDef
        Title "DocWin4"
        Intermediate timesGrp.dept_no
        Filter (timesGrps.tgserial.dept_no ->  #
                 mdDept.dept_no.mdserial)
        Layout Md_Lname, Md_Dept
    }
}
```

FIG. 7(a)-2

```
BaseDef       DeptDef

Table    deptTbl.dept_no
    Dept_Name   REG    20 Char deptTbl.dept_no.dept_desc
    Dept_TGroups POPWIN
    {
            Base    TimesDef
            Title   "TimesWin2"
            Filter  (timesGrp.dept_no.times_id)
            Layout  Tm_Grp, Tm_Time, Tm_Md
    }
    TGrp3 POPWIN
    {
            Base    TimesDef
            Title   "TimesWin3"
            Filter  (timesGrp.dept_no.times_id)
            Layout  Tm_Grp, Tm_DocWin3
    }
    TGrp4 POPWIN
    {
            Base    TimesDef
            Title   "TimesWin4"
            Filter  (timesGrp.dept_no.times_id)
            Layout  Tm_Grp, Tm_DocWin4
    }
}
```

FIG. 7(a)-3

```
WindowDef      MDSchedulable
{
       Base     MdDef
       Title    "DOCTORS WINDOW"
       Layout   Md_Name, Md_Dept, Md_TGrps, Md_Subst
       Sort     Md_Name
       FilCol   Md_Name
}

WindowDef      DeptCover
{
       Base     DeptDef
       Title    "DEPARTMENT COVERAGE"
       Layout   Dept_Name, Dept_TGroups
       Sort     Dept_Name
       FilCol   Dept_Name
}

WindowDef      DeptA
{
       Base     DeptDef
       Title    "DEPARTMENT ASSIGNMENT A"
       Layout   Dept_Name, TGrp3
       Sort     Dept_Name
       FilCol   Dept_Name
}

WindowDef      DeptB
{
       Base     DeptDef
       Title    "DEPARTMENT ASSIGNMENT B"
       Layout   Dept_Name, TGrp4
       Sort     Dept_Name
       FilCol   Dept_Name
}
```

FIG. 7(b)

```
GroupDef
{
    1.  "Master Def Files ->"
        2.  "Schedulable People ->"
            3.  "*Medical Doctors*", MDSchedulable 1.  "Department ->"
        2.  "*Department Coverage*", DeptCover
        2.  "*Department Assignments A*", DeptA
        2.  "*Department Assignments B*", DeptB
}
```

FIG. 8

```
         DEPARTMENT COVERAGE
   DEPARTMENT        TIMES DEFS
   Radiology,InPat   TimesWin2 *
   Radiology,OutPat  TimesWin2 *
   Surgery,InPat     TimesWin2 *
   Surgery,OutPat    TimesWin2 *
```

FIG. 9(a)

```
         DEPARTMENT COVERAGE
   DEPARTMENT        TIMES DEFS
   Radiology,InPat   TimesWin2 *
   Radiology,OutPat  TimesWin2 *
   Surgery,InPat    GROUP   TIMES              DOCTORS
   Surgery,OutPat   RedIn   Tue 14:00-16:00 )* Conrad )*
                    BlueIn  MWF 09:00-12:00 )* Daniels
                    AllIn
```

FIG. 9(b)

```
         DEPARTMENT COVERAGE
   DEPARTMENT        TIMES DEFS
   Radiology,InPat   TimesWin2 *
   Radiology,OutPat  TimesWin2 *
   Surgery,InPat    GROUP   TIMES              DOCTORS
   Surgery,OutPat   RedIn   Tue 14:00-16:00    Conrad
                    BlueIn  Thu 13:30-15:00    Daniels
                    AllIn                      Gardner
                                               Hanson
```

FIG. 9(c)

```
          DEPARTMENT ASSIGNMENT A
   DEPARTMENT          TIMES    GROUPS
 Radiology,InPat       TimesWin3  *
 Radiology,OutPat      TimesWin3  *
 Surgery,InPat         TimesWin3  *
 Surgery,OutPat        TimesWin3  *
```
FIG. 11(a)

```
          DEPARTMENT ASSIGNMENT A
   DEPARTMENT          TIMES    GROUPS
 Radiology,InPat       TimesWin3  *
 Radiology,OutPat      TimesWin3  *
 Surgery,InPat       GROUP      DOCTORS
 Surgery,OutPat      RedIn      DocWin3 *
                     BlueIn     DocWin3 *
                     AllIn
```
FIG. 11(b)

```
          DEPARTMENT ASSIGNMENT A
   DEPARTMENT          TIMES    GROUPS
 Radiology,InPat       TimesWin3  *
 Radiology,OutPat      TimesWin3  *
 Surgery,InPat       GROUP      DOCTORS
 Surgery,OutPat      RedIn      LAST     DEPT
                     BlueIn     Conrad   Surgery,InPat  )*
                     AllIn      Daniels  Surgery,OutPat
                                Gardner  Surgery,InPat  )*
                                Hanson   Surgery,OutPat
```
FIG. 11(c)

```
          DEPARTMENT ASSIGNMENT A
   DEPARTMENT          TIMES    GROUPS
 Radiology,InPat       TimesWin3  *
 Radiology,OutPat      TimesWin3  *
 Surgery,InPat       GROUP      DOCTORS
 Surgery,OutPat      RedIn      LAST     DEPT
                     BlueIn     Conrad   Surgery,InPat
                     AllIn      Daniels  Surgery,OutPat  )*
                                Gardner  Surgery,InPat
                                Hanson   Surgery,OutPat
```
FIG. 11(d)

```
            DEPARTMENT ASSIGNMENT B
    DEPARTMENT        TIMES     GROUPS
    Radiology,InPat   TimesWin4  *
    Radiology,OutPat  TimesWin4  *
    Surgery,InPat     TimesWin4  *
    Surgery,OutPat    TimesWin4  *
```
FIG. 13(a)

```
            DEPARTMENT ASSIGNMENT B
    DEPARTMENT        TIMES     GROUPS
    Radiology,InPat   TimesWin4  *
    Radiology,OutPat  TimesWin4  *
    Surgery,InPat    GROUP      DOCTORS
    Surgery,OutPat   RedIn      DocWin4 *
                     BlueIn     DocWin4 *
                     AllIn
```
FIG. 13(b)

```
            DEPARTMENT ASSIGNMENT B
    DEPARTMENT        TIMES     GROUPS
    Radiology,InPat   TimesWin4  *
    Radiology,OutPat  TimesWin4  *
    Surgery,InPat    GROUP     DOCTORS
    Surgery,OutPat   RedIn     LAST      DEPT
                     BlueIn    Conrad    Surgery,InPat )*
                     AllIn     Garnder   Surgery,InPat )*
```
FIG. 13(c)

```
            DEPARTMENT ASSIGNMENT B
    DEPARTMENT        TIMES     GROUPS
    Radiology,InPat   TimesWin4  *
    Radiology,OutPat  TimesWin4  *
    Surgery,InPat    GROUP     DOCTORS
    Surgery,OutPat   RedIn     LAST      DEPT
                     BlueIn    Conrad    Surgery,InPat
                     AllIn     Gardner   Surgery,OutPat
```
FIG. 13(d)

FIG. 15(a)

```
TableEquivDef
{
        mdmaster.mdnum
        mdDept.mdserial
        substCross.mdserial
        timesCross.docserial
}

TableEquivDef
{
        deptTbl.dept_no
        mdDept.dept_no
        timesGrps.dept_no
}

TableEquivDef
{
        substGrps.subgrpnum
        substCross.sgserial
}

TableEquivDef
{
        timesGrps.tgserial
        timesCross.times_id
        timeSets.times_id
}
```

FIG. 15(b)

```
TableEquivDef
{
        timeSets.tspan_id
        timeSpan.tspan_id
}

ScreenNodeDef
{
        mdmaster  "Doctors" mdmaster.mdnum #
                <mdmaster.mdnum.md_Fname> [1 Char] #
                <mdmaster.mdnum.md_Lname>[1 Char]
        deptTbl "Departments" deptTbl.dept_no #
                <deptTbl.dept_abbr> [4 Char]
        substGrps "Subst Groups" substGrps.subgrpnum #
                <substGrps.sg_abbr> [4 Char]
        timesGrps "TimesG" timesGrps.tgserial #
                <timesGrps.time_abbr> [8 Char]
        timeSpan  "Time Chunks" timeSpan.tspan_id #
                <timeSpan.tspan_day> [5 Char] " " #
                <timeSpan.tspan_start> [5 Char] "-" #
                <timeSpan.tspan_end> [5 Char]
}
```

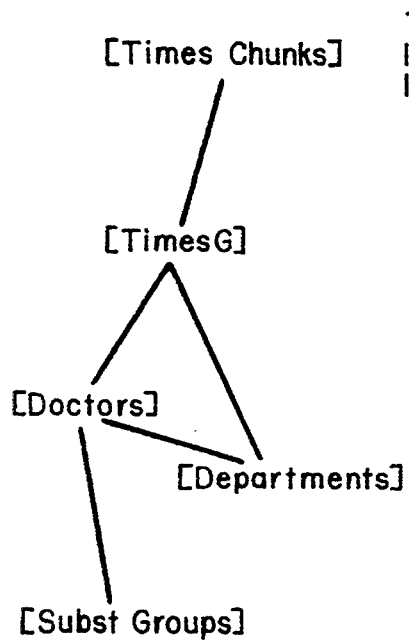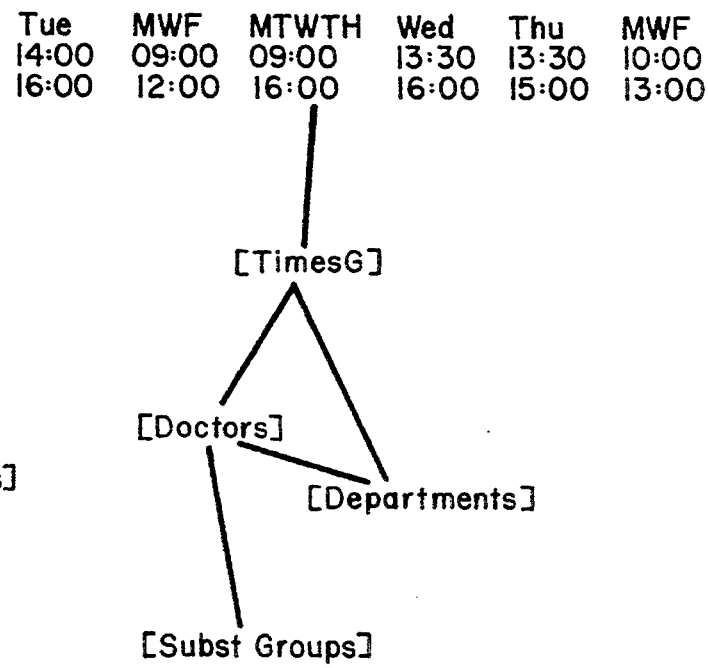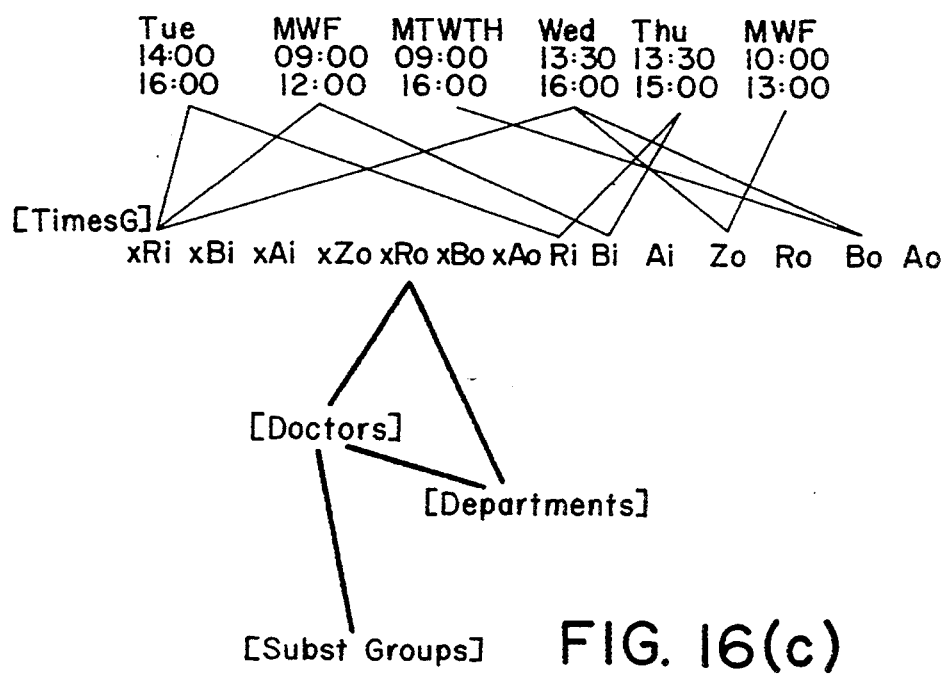
FIG. 16(a)
FIG. 16(b)
FIG. 16(c)

METHOD AND APPARATUS FOR DISPLAYING AND UPDATING STRUCTURED INFORMATION

BACKGROUND

1. Field of the Invention

The present invention is directed to a system which displays and/or updates structured information such as the structured information that is stored in plural interrelated tables or in multipartite graphs like a structured relational database. In particular, the invention is directed to a system which displays either data from the structured information or an indication of interrelationships in the structure, wherein when data is displayed the data is filtered based on the interrelationships in the structure.

2. Description of the Related Art

Many different situations require the organization and storage of large amounts of information in computer accessible form so that the information may be retrieved and utilized efficiently. In one situation, for example, a hospital may need to store information concerning its medical staff, the times during which the staff members are normally available, and the names of staff members which may be substituted for an unavailable staff member. In another situation, a school may need to store information concerning its teaching staff, its student population, and the courses that the school offers and the students are enrolled in. Similar examples can be found in virtually any field, particularly business and scientific fields.

FIG. 25(a) is a simplified example of how information can be structured so as to facilitate its use. In FIG. 25(a), the structure is represented by a graph in which every entry (or mode) on the top row ("A", "B" and "C") is connected to every entry on the bottom row ("D", "E" and "F"). This structure can be represented in different but equivalent ways. For example, the graph in FIG. 25(b) has the same structure because the interconnections and interrelationships between the entries are the same. Likewise, the information displayed in FIG. 25(c) has the same structure as that in both FIGS. 25(a) and 25(b) although only the connections from node "B" are displayed (in the form of a pop-down window).

Structured information like that shown in FIGS. 25(a) through (c) has conventionally been stored in tables so that is can be used by computers. The structure of the information is known mathematically as a "multipartite graph" (FIGS. 25(a) through (c) are examples of "bi-partite graphs"), and the tables are partitions of the graph. Thus, referring to FIG. 25(a), the graph may be partitioned along the dotted line into two partitions, each of which may be stored in computer-readable tables. The rows of the table are considered to represent a record and the columns of the table are the individual data entries. Single records in a table may refer, for example, to people and the entries may be information about each person, such as name, address, telephone number, etc. When associating such tables with a graph, each set of nodes of the graph associate with a table, and the connection lines between two sets of nodes of the graph either are a table or are incorporated into a table.

As the number of interrelationships in the structured information increases, the complexity of the structure increases and many tables (or partitions) may be used to store the information. For example, in the situation where it is needed to store information about students and about teachers, it is not practical to store the information in a single table because the information needed to be stored for students is different than the information needed to be stored for teachers.

To handle large quantities of diverse yet related information, formalized computer structures such as relational databases have conventionally been used. (The invention can be implemented with any structured collection of information, relational databases being one such collection.) A relational database is a collection of individual tables in which each of the tables is only a subset of the total amount of information in the relational database. In the above example, a first table in the relational database might be a student table consisting of student name, identification number, dormitory assignments, etc.; and a second table in the relational database might be a course table consisting of course name, prerequisites, class time, place, etc. The relationship between students and courses is many-to-many, that is, many different students are enrolled in many different courses. Thus, a third, intermediary table is created which cross-references students to courses. This, then, provides two join fields, the student and the course, which together give the cross-reference of student-to-course.

The individual tables in a relational database are normally linked with one another through "join fields". In the above example, the join fields were the student identification number and the course number. Such a field links or joins the tables in the database. To correlate the information in a first table with the information in a second table, first the join field is extracted from the first table. Next, the join field is indexed to the second table by which it can be determined which entries in the two tables are associated. Usually, the indexing is via an intermediary, cross-reference, table (e.g., in "many-to-many" situations) but where an entry is joined directly into a table (e.g., a "many-to-one" situation) there is usually no need for an intermediate table.

Relational databases are effective to break complexly structured information into comprehensible and manageable units. Nevertheless, as the information grows and the complexity of the interrelationships increases, it becomes more and more difficult to find information and to use and/or modify the information effectively.

Assume, for example, that is desired to determine how a student can fulfill his minimum course requirements. This task requires correlation between a student, the course requirements for his core curriculum, the times and dates that the courses are offered in, the availability of the student during those times and dates, the availability of professors during those times and dates, etc. Each of these items of information is normally available in a separate table in a relational database, but owing to the complexity of the interrelationships between those tables, it has not heretofore been practical to correlate that information and to display it in useable form.

Or to consider the problem of adding or deleting a course. The course joins with the teachers giving the course, the usage of facilities, books, students taking courses, schedules for facilities, maintenance, people, etc. If one piece of information is added, changed, or modified, it is desirable to see all those changes wherever they are referenced, and to be able to request that those changes propagate through the graph appropriately. Thus, when displaying the courses a student is taking, a deleted course should not be displayed and the deletion should not cause an error.

SUMMARY OF THE INVENTION

It is an object of the present invention to address the foregoing difficulties.

In another aspect, the invention provides a method and apparatus for displaying and updating information stored in a multipartite graph structure, such as a plurality of interrelated tables. A structural map that describes the interrelationships and pathing between graph node sets (which correspond to the table indices) is defined. The acquired data is filtered in accordance with pathing used to locate the data, as defined in the structural map. Further, the invention provides a method and apparatus in which displayed information may be manipulated as defined by the structural map.

In another aspect, the invention provides a method and apparatus for displaying structured information such as that which is stored in a plurality of interrelated tables. A structural map that describes interrelationships and pathing is defined. The structural map may be in the form of a multiple index multipartite graph, or a representation of such a graph that is stored in a computer. Based on a display map, either information is displayed, or an indication of further structure is displayed. When information is displayed, the information is filtered in accordance with the structure defined in the structural map. The display map describes where information from the table is to be displayed, and where, rather than displaying information from the tables, information concerning the structural interrelationship of the tables is to be displayed. The display may be in the form of pop-down windows and those windows may contain mixed data and structural information, or the display may be a graphical representation. The system works with a query interface so as to provide operator accessibility to the desired information.

In another aspect, the invention provides a method and apparatus for displaying information stored in a multipartite graph structure such as plural interrelated tables, and for allowing this information to be changed (e.g., by adding, deleting, or modifying). A display map that chooses the type of information to be displayed and which describes the visual presentation of that information (such as graphic or tabular) is defined. The display map defines when data from the structured information is to be displayed and when, rather than displaying data, the structure itself is to be displayed. In response to a query-based interaction with an operator, data or structure in accordance with the display map is displayed, and when data is displayed it is filtered by previous levels of structure such that only information of concern to the query is displayed. The information may be edited such as by changing, adding or deleting information. The appropriate one of the plural interrelated tables is updated based on the edit. In the case of deletion, dangling joins are deleted, preferably under operator supervision; in the case of additions, new joins are created.

For example, a classical database problem concerns finding and deleting or moving data that is very active or very inactive. If a database/graph includes historical footprints of usage (like timestamping), then the invention can filter and order data presentation according to these footprints and allow the user to view or change or delete an entire subgraph associated with some time component.

This brief summary of the invention is provided so that the nature of the invention may be understood quickly. A fuller understanding may be obtained by reference to the following detailed description of the invention in connection with the appended drawings.

BRIEF DESCRIPTION OF THE DRAWINGS

FIG. 4($a$) through 4($d$) are views showing representative displays according to the invention;

FIG. 6 is a representative structural map;

FIG. 7, comprising FIGS. 7($a$)-1 thru 7($a$)-3 and 7($b$), is a representative display map;

FIG. 8 is a representative selection menu;

FIGS. 9($a$) through 9($c$), 11($a$) through 11($d$), and 13($a$) through 13($d$) are views showing further displays according to the invention;

FIGS. 15 through 24 are views for explaining a graphic display of structured data.

DETAILED DESCRIPTION OF THE PREFERRED EMBODIMENT

Figure 1:
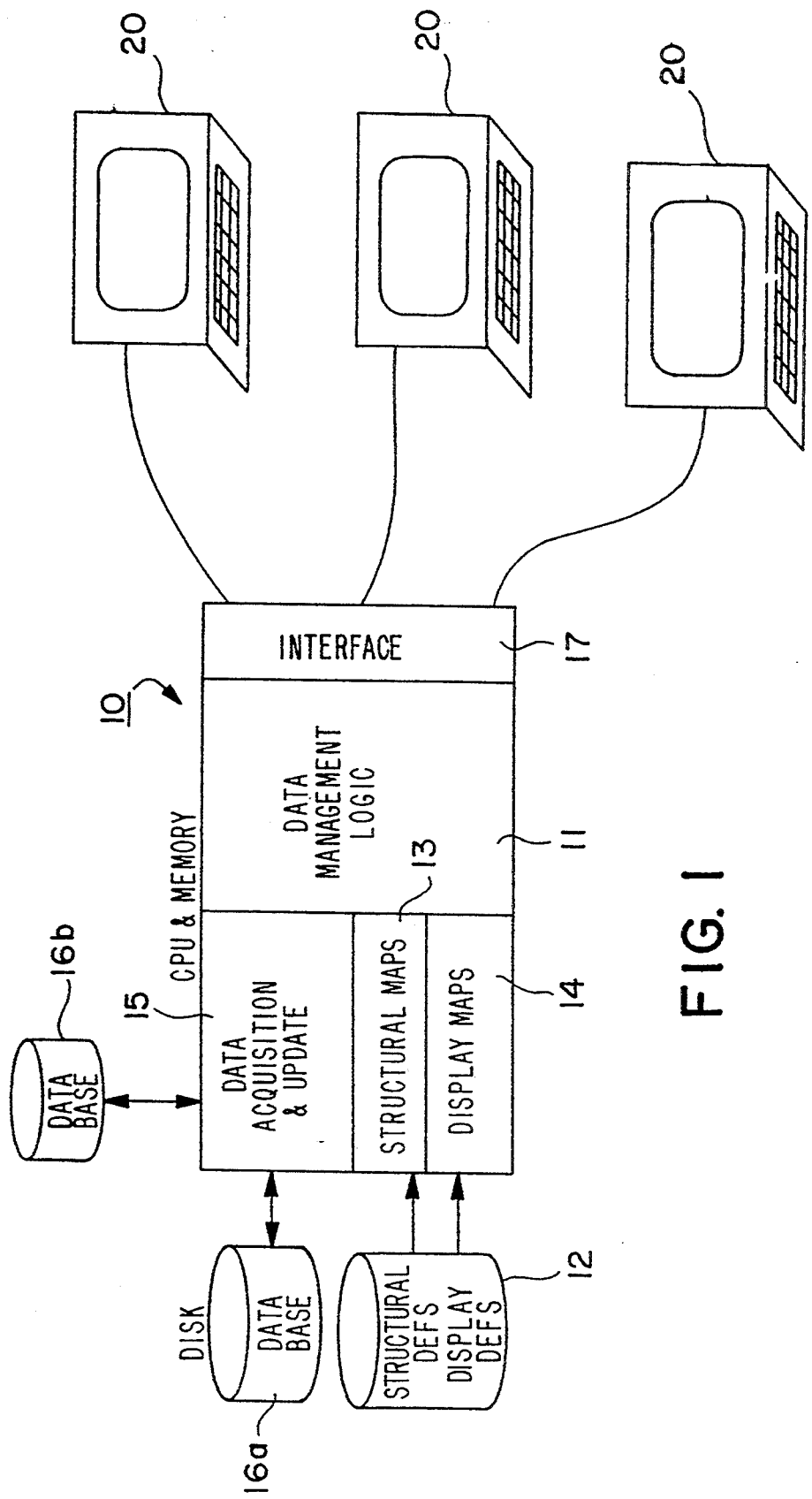
FIG. 1 is a block diagram showing an embodiment of the invention.

A system according to the invention is shown in FIG. 1. The system includes a main processing unit 10 to which is connected plural terminals 20. Main processing unit 10 includes a CPU for executing stored instructions comprising a computer program so as to form data management logic section 11. A memory 13 stores a structural map which defines interrelations and pathing in structured information, and a memory 14 stores display maps which define what is to be displayed on terminals 20 and the sequence and placement of information on the terminal.

The structural maps and display maps may be stored externally of main processing unit 10, for example on a disk drive unit 12. Preferably, however, the maps are loaded into memories 13 and 14 so as to avoid disk access delays and to increase execution speed.

Main processing unit 10 also includes data acquisition and update logic 15 for accessing the structured information. As shown in FIG. 1, the structured information is stored on external disk drives 16$a$ and 16$b$ and is loaded, under the control of data acquisition and update logic 15, into memory as needed. In the embodiment described here, the structured information is stored as plural interrelated tables such as those in a relational database. It is to be understood, however, that the organization of the data into tables is not necessary for the practice of the invention; rather, tables are only representative of one way of organizing and storing multipartite graph information.

Disks 16$a$ and 16$b$ need not be physically co-located with processor 10 but may, if desired, interact with data acquisition and update logic 15 through unshown intermediary devices such as a network link, a modem, or the like.

Main processing unit 10 further includes a communications interface 17 for communicating with each of plural terminals 20. The communication interface coordinates access by the individual terminals with the relational database, and controls access to that relational database with respect to locking rules, updating, privileged access, etc.

Other peripheral equipment may be associated with main processing unit 10, such as printer equipment and additional mass storage in the form of disk memory. Such peripherals are unimportant to the details of the present invention and they have accordingly been omitted in the interest of brevity.

The plural terminals 20 allow operator access to the data stored in the relational database. The terminals may be simple "dumb" terminals which rely on the computational power of main processing unit 11 or they may be "smart" terminals such as a personal computer which includes a microprocessor, memory, etc. Preferably, such terminals are provided with a graphics user interface such as "Windows" so as to facilitate presentation of data to the operator.

One or more of the plural terminals 20 may be designated as a supervisory terminal having special privileges with respect to altering the contents of the tables in memory 12. In such a case, others of the plural terminals would only be permitted to view or access the information in the tables and would not be able to alter it. If desired, one terminal may be resident in or a part of main processing unit 10.

The plural terminals 20 are comprised by a conventional display panel as output means, and a conventional input device such as a keyboard. If desired, a pointing device such as a mouse may also be included so as to allow an operator easily to target specific portions of the display.

The specific information stored in the plural tables comprising the database in memory 12 is unimportant to the details of the invention. The structure of the tables is such that there are plural interlinked tables stored on disks 16a and 16b. Typically, each of the tables have at least one join field which links that table to at least one other table in memory 12. Usually, each table further includes at least one join field which allows it to be linked with other tables in the database. The two join fields may be the same field in which case the table is accessed by the same field with which it accesses other tables.

It is possible for there to be more than one join field in each table so as to permit a table to be linked in different ways with different tables, and it is also possible for a table to be joined to several other tables. Various join configurations yield many different structural possibilities. For example, many tables can join into one table ("many-to-one"); one table can include many join fields that branch out to many other tables ("one-to-many"); or many tables can join into one table which in turn joins into many other tables ("many-to-many"). All these structural possibilities create a variety of paths and multidimensionalities in the multipartite graph represented by the tables.

The structural map stored in memory 13 is dependent upon both the structure of the interrelationships in the tables and the organization of information in the individual tables. The structural maps may be derived automatically by the CPU but typically are prepared manually based on the overall structure and interrelationship of the tables.

The display maps stored in memory 14 define the information that is to be displayed on terminals 20 in response to query information from an operator, and the manner and placement for displaying that information on the terminals. The display maps may be defined in accordance with predetermined standard definitions by the CPU, but more typically the display maps are prepared manually in accordance with the particular configuration of the overall system, the needs for which the system was implemented, and the desired presentation of information from the tables.

Figure 2:
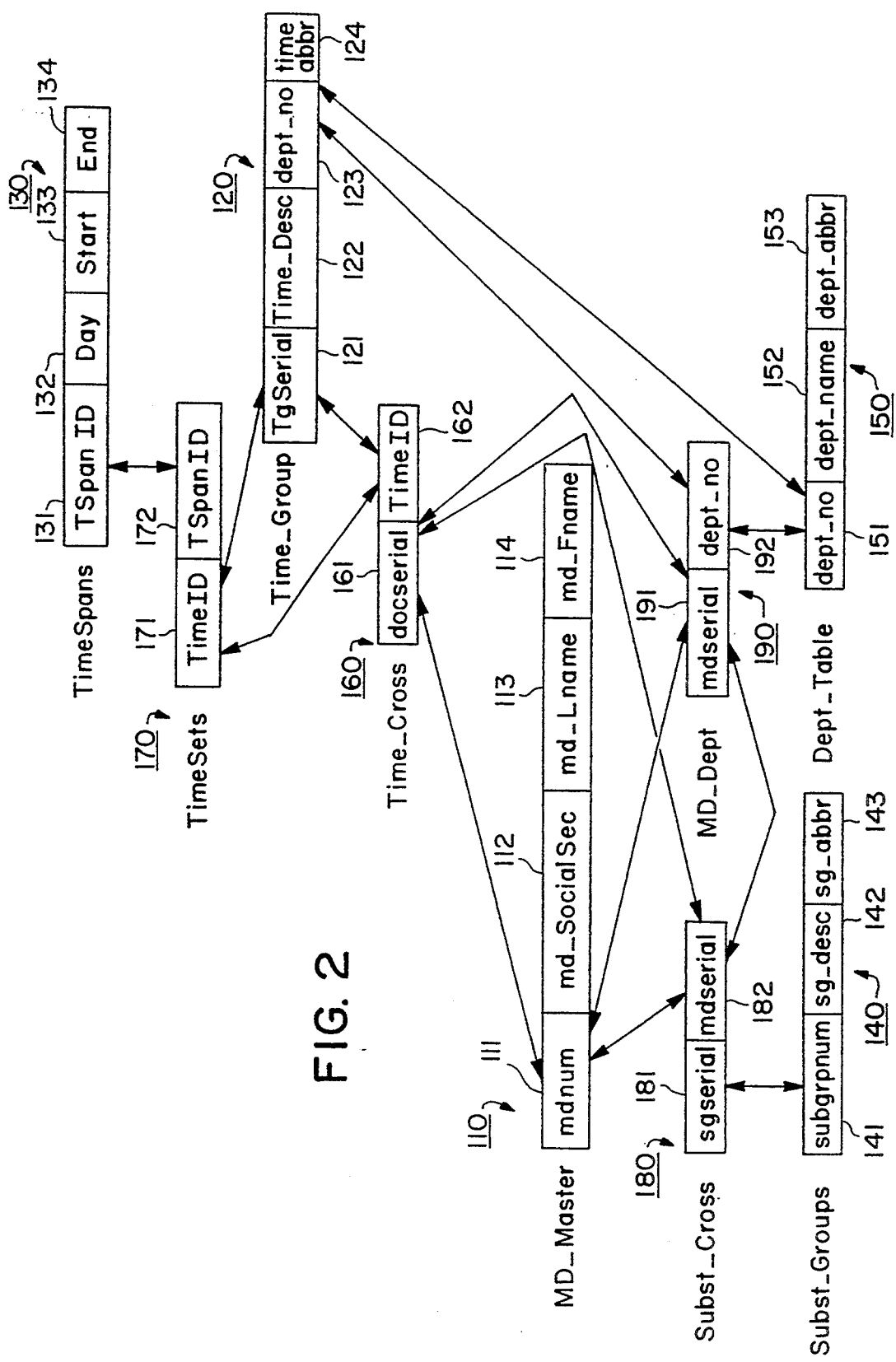
FIG. 2 is a view for explaining structural interrelationships among plural tables containing information.

A representative example of the structure of the information stored in the interrelated tables in memory 12 is shown at FIG. 2. The structure shown in FIG. 2 is provided in connection with a system used in a hospital and doctor scheduling system, but it is to be understood this is for illustrative purposes only and is not in any way to be construed as limiting.

The information stored in the tables represented by FIG. 2 is designed to allow a hospital to schedule doctors based on the times during which the particular doctor is available, as designated by a time group to which the doctor belongs, and based on the type of services which the doctor performs, as designated by the department to which the doctor belongs. It also allows to select an alternate doctor for doctors that are unavailable based on a substitutable group to which doctors belong. The substitutable groups are normally defined by similarity in practice areas and medical background, as will become more evident in the description that follows.

Thus, as shown in the representative example of FIG. 2, information about the doctors is stored in nine separate tables, namely a doctor information table, "mdmaster" 110, a time availability group table "timeGrp" 120, a time span definitional table "timeSpans" 130, a substitutable group table "substGrp" 140 and a department definition table "deptTbl" 150. These tables are tied together by cross-reference tables which include a cross-reference table which relates doctors to the times that they are available "timeCross" 160, a table that relates time group descriptions to the time spans that the groups are associated with "timeSets" 170, a table that defines the substitutable groups to which doctors belong "substCross" 180, and a table that relates doctors to the departments to which they belong "mdDept" 190.

In more detail, the doctor information table 110 includes fields 111, 112, 113 and 114 which are labelled "mdnum" "md_ss", "md_Lname" and "md_Fname", respectively. Other information could also be stored in the doctor information table (additional information can be stored in any of the tables) but that information is omitted here for the sake of brevity. The mdnum field 111 is provided as a join field to join the doctor information table 110 to the time availability cross-reference table 160, the substitutable group cross-reference table 180, and the doctor's department cross-reference table 190.

The time availability group table 120 includes fields 121, 122, 123 and 124 which are labelled "TgSerial", "time_desc" for storing a code word regarding time availability, "dept_no" for storing a numerical department number designation, and "time_abbr" for storing an abbreviation, respectively. The TgSerial field 121 is a join field which permits time availability group table 120 to be linked to the time availability cross-reference table 160 and the timeSets cross-reference table 170.

The timespan definitional table 130 includes fields 131, 132, 133 and 134 which are labelled "tspan_id", "tspan_day" for storing the day of the week, "tspan_start" for storing the start time, and "tspan_end" for storing the end time, respectively. The tspan_id field 131 is a join field for linking the timeSpan table 130 to the timeSets cross-reference table 170.

The substitutable group table 140 includes fields 141, 142 and 143 which are labelled "subgrpnum" for storing a numerical designation of the substitutable group, "sg_desc" for storing a descriptive title of the substitutable group, and "sg_abbr" for storing an abbreviation for the group, respectively. The subgrpnum field 141 is a join field for linking the substitutable group table 140 the substitutable group cross-reference table 180.

The department table 150 includes field 151, 152 153 which are labelled "dept_no", "dept_name", and "dept_abbr", respectively. The "dept_no" field 151 is a join field for joining department table 150 with time availability group table 120 and the doctor's department cross-reference table 190.

The time availability cross-reference table 160 includes fields 161 and 162 which are labelled "docserial" and "time_id", respectively. The docserial field 161 is a join field which links the time availability table 160 with doctor information table 110, substitutable group cross-reference table 180 and doctor's department cross-reference table 190. In addition, time_id field 162 is also a join field and joins the time availability cross-reference table 160 with timeSets table 170 and time availability group table 120.

The timeSets cross-reference table 170 is a table which correlates a time group with the time spans during which the group is active. The table includes fields 171 and 172 which are labelled "time_id" and "tspan_id", respectively. The time_id field 171 is a join field for linking timeSets table 170 with time availability cross-reference table 160 and time availability group table 120. Likewise, tspan_id field 172 is a join field for linking timeSets 170 to timespan definitional table 130.

The substitutable group cross-reference table 180 defines which doctors are part of which substitutable groups. The table includes fields 181 and 182 which are labelled "sgserial" and "mdserial", respectively. The sgserial field 181 is a join field which links substitutable group cross-reference table 180 with substGrp table 140. Likewise, the mdserial field 182 is a join field which links substCross table 180 with mdmaster table 110, timeCross table 160, and mdDept table 190.

The doctor's department membership table 190 is a table that defines which department each doctor belongs to. The table includes fields 191 and 192 which are labelled "mdserial" and "dept_no", respectively. The mdserial field 191 is a join field which links mdDept table 190 with mdmaster table 110, timeCross table 160, and substcross table 180. Likewise, the dept_no is a join field that links mdDept table 190 with timeGrp table 120 and deptTbl table 150.

The structure shown by the interrelationships among the tables of FIG. 2 may be stored as a structural map that defines pathing between the tables. Mathematically, this is equivalent to the multiple index multipartite graph which defines the structure. A representation of that graph may be defined and stored in computer utilizable form, as described more fully below.

In use, an operator of one of terminals 20 enters query information so as to request display of certain parts of the information stored in the tables of FIG. 2. For example, it may be requested to display doctors, the departments that they are in, the times that they are available, and doctors that may be substituted. Because of the complexity and richness of the information stored in the tables, however, it may not be possible always to display the information directly. Rather, it may be necessary to display an indication of the structure of the tables thereby permitting the operator to enter additional queries so as to path along the structure to the desired information. When information (as opposed to structural indications) is displayed, however, the information is filtered by the previous level of structures so as to eliminate irrelevant information and to permit the operator to concentrate on information that is pertinent to the query. For example, if the operator is entering queries regarding substitutable groups, there may be no need to see each and every substitutable group that exists. Rather, it may only be necessary to see the substitutable groups to which a particular doctor belongs.

This operation may be understood more clearly by examining specific examples of display. Representative data for storage in the tables shown in FIG. 2 is listed below to facilitate these illustrations.

| mdmaster | | | |
|---|---|---|---|
| mdnum | md_ss | md_Lname | md_Fname |
| 20 | 123-77-1234 | Adams | Brian |
| 21 | 222-22-2222 | Baker | John |
| 25 | 234-56-7890 | Conrad | Jeremy |
| 26 | 235-67-8888 | Daniels | Charles |
| 27 | 334-12-1234 | Egan | Andrew |
| 28 | 233-56-5678 | Farmer | Jason |
| 32 | 234-34-4567 | Gardner | Peter |
| 33 | 456-78-9012 | Hanson | Torvald |

| deptTbl | | |
|---|---|---|
| dept_no | dept_name | dept_abbr |
| 12 | Radiology, InPat | Rin |
| 13 | Radiology, OutPat | Rout |
| 14 | Surgery, InPat | Sin |
| 15 | Surgery, OutPat | Sout |

| mdDept | |
|---|---|
| mdserial | dept_no |
| 20 | 12 |
| 20 | 13 |
| 21 | 12 |
| 21 | 13 |
| 25 | 15 |
| 26 | 15 |
| 32 | 15 |
| 33 | 15 |
| 25 | 14 |
| 27 | 12 |
| 28 | 12 |
| 28 | 13 |
| 32 | 14 |

| substGrps | | |
|---|---|---|
| sgserial | sg_desc | sg_abbr |
| 50 | Radiology, Gen | RGn |
| 51 | Radiology, Neuro | RNe |

| substGrps | | |
|---|---|---|
| sgserial | sg_desc | sg_abbr |
| 52 | Radiology, GI | RGi |
| 53 | Radiology, Emerg | REm |
| 54 | Radiology, Teach | RT |
| 55 | Radiology, GI | RGI2 |
| 56 | Surgery, Gen | SGn |
| 57 | Surgery, Emerg | SEm |
| 58 | Podiatry | Pod |

| substCross | |
|---|---|
| sgserial | mdserial |
| 20 | 50 |
| 20 | 51 |
| 20 | 52 |
| 20 | 53 |
| 20 | 54 |
| 21 | 50 |
| 21 | 51 |
| 32 | 56 |
| 27 | 51 |
| 25 | 56 |
| 25 | 57 |
| 26 | 56 |
| 26 | 57 |
| 26 | 58 |
| 28 | 52 |
| 28 | 54 |
| 33 | 57 |

| timesGrp | | | |
|---|---|---|---|
| times_id | times_desc | Time_abbr | dept_no |
| 2 | xRedIn | xRi | 12 |
| 3 | xBlueIn | xBi | 12 |
| 4 | xAllIn | xAi | 12 |
| 5 | xABCOut | xZo | 13 |
| 6 | xRedOut | xRo | 13 |
| 7 | xBlueOut | xBo | 13 |
| 8 | xAllOut | xAo | 13 |
| 9 | RedIn | Ri | 14 |
| 10 | BlueIn | Bi | 14 |
| 11 | AllIn | Ai | 14 |
| 12 | ABCOut | Zo | 15 |
| 13 | RedOut | Ro | 15 |
| 14 | BlueOut | Bo | 15 |
| 15 | AllOut | Ao | 15 |

| timesSpan | | | |
|---|---|---|---|
| tspan_id | tspan_day | tspan_start | tspan_end |
| 70 | Tue | 14:00 | 16:00 |
| 71 | MWF | 09:00 | 12:00 |
| 72 | MTWTF | 09:00 | 16:00 |
| 73 | Wed | 13:30 | 16:00 |
| 74 | Thu | 13:30 | 15:00 |
| 75 | MWF | 10:00 | 13:00 |

| timesCross | |
|---|---|
| docserial | times_id |
| 20 | 2 |
| 25 | 9 |
| 26 | 9 |
| 33 | 9 |
| 32 | 9 |
| 25 | 12 |
| 25 | 14 |

| timesCross | |
|---|---|
| docserial | times_id |
| 26 | 10 |

| timeSets | |
|---|---|
| times_id | tspan_id |
| 2 | 70 |
| 2 | 71 |
| 2 | 73 |
| 9 | 70 |
| 9 | 74 |
| 12 | 73 |
| 12 | 75 |
| 14 | 72 |
| 14 | 73 |
| 10 | 71 |
| 10 | 74 |

Figure 3:
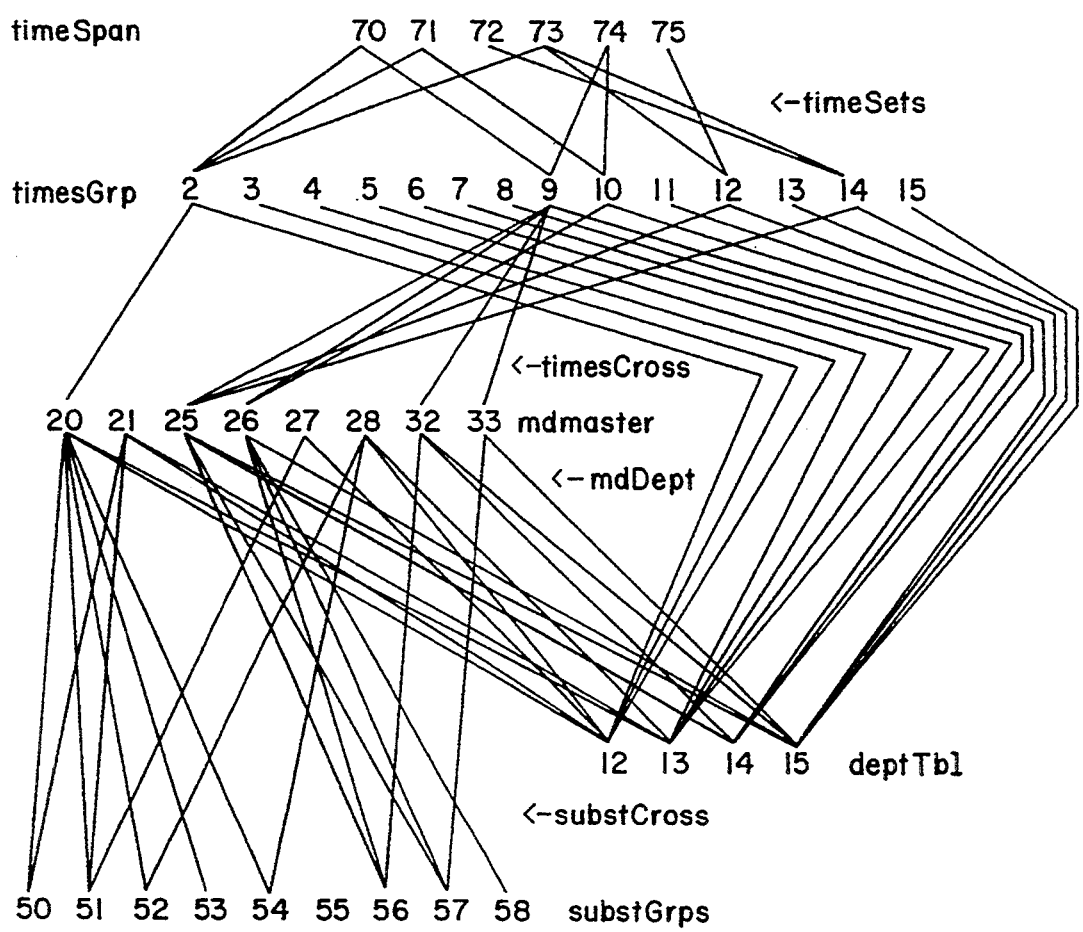
FIG. 3 is a graph showing interconnections in representative data in plural tables.

By virtue of the structural map of FIG. 2, the above data interrelations are derived, as shown in FIG. 3. FIG. 3 is different from FIG. 2 in that FIG. 2 is a structural map showing interrelationships and pathing amongst the various tables, while FIG. 3 shows how data entries in each particular table is joined to data entries in other tables. These relationships shown in FIG. 3 depend on actual data content whereas the structural map shown in FIG. 2 is independent of the data.

FIG. 4(a) shows one possible display that an operator may obtain in response to a query of the information listed above in the structure shown in FIG. 2. As shown in FIG. 4(a), an operator has requested information about doctors, the departments to which the doctors belong, the times that the doctors are available, and the substitutable groups from which doctors are listed sequentially on the display, with each row of the display corresponding to the doctor listed to the extreme left. Information about each doctor may take two forms in accordance with the display maps described hereinbelow and in accordance with the structural maps shown in FIG. 2. In the first form, the display may include specific information about the doctor such as the departments to which the doctor belongs or the substitutable groups from which alternates may be selected. The second type of display is a display of structural information such as the time group information shown in FIG. 4(a). That display is not specific information about the doctor but rather is an indication of additional structure from which information may be obtained.

Reverting to FIG. 4(a), when information is to be displayed, such as the department or substitutable groups for each doctor, the information may be displayed in one of two forms. First the information may be a single entry of information such as the department information for Dr. Charles Daniels. That information shows a single entry, namely "surgery, outpatient". But in most cases, a single entry is insufficient to show all the information there is about each doctor. In that case, two display techniques may be used. First a thumbscrew symbol ")" (or other icon) may be used indicating that it is possible to roll through entries. Only a single entry will be displayed at any one time but that entry may be changed through operator query information such as by manipulation of a mouse or cursor keys.

Alternatively, a star ("*") (or other icon) may be used to show that a pop-down window is available for that entry. Pop-down entries are shown in FIG. 4(b) under the department column for Dr. John Baker and under the substitutable group column for Dr. Brian Adams. In each instance, all the information that is available for each entry is displayed in a window superimposed over the original window. Thus, while in FIG. 4(a) only "Radiology, Gen" is displayed for Dr. Brian Adams, in FIG. 4(b), all the substitutable groups for Dr. Brian Adams are displayed in a window that is superimposed over the original window.

Figure 5A:
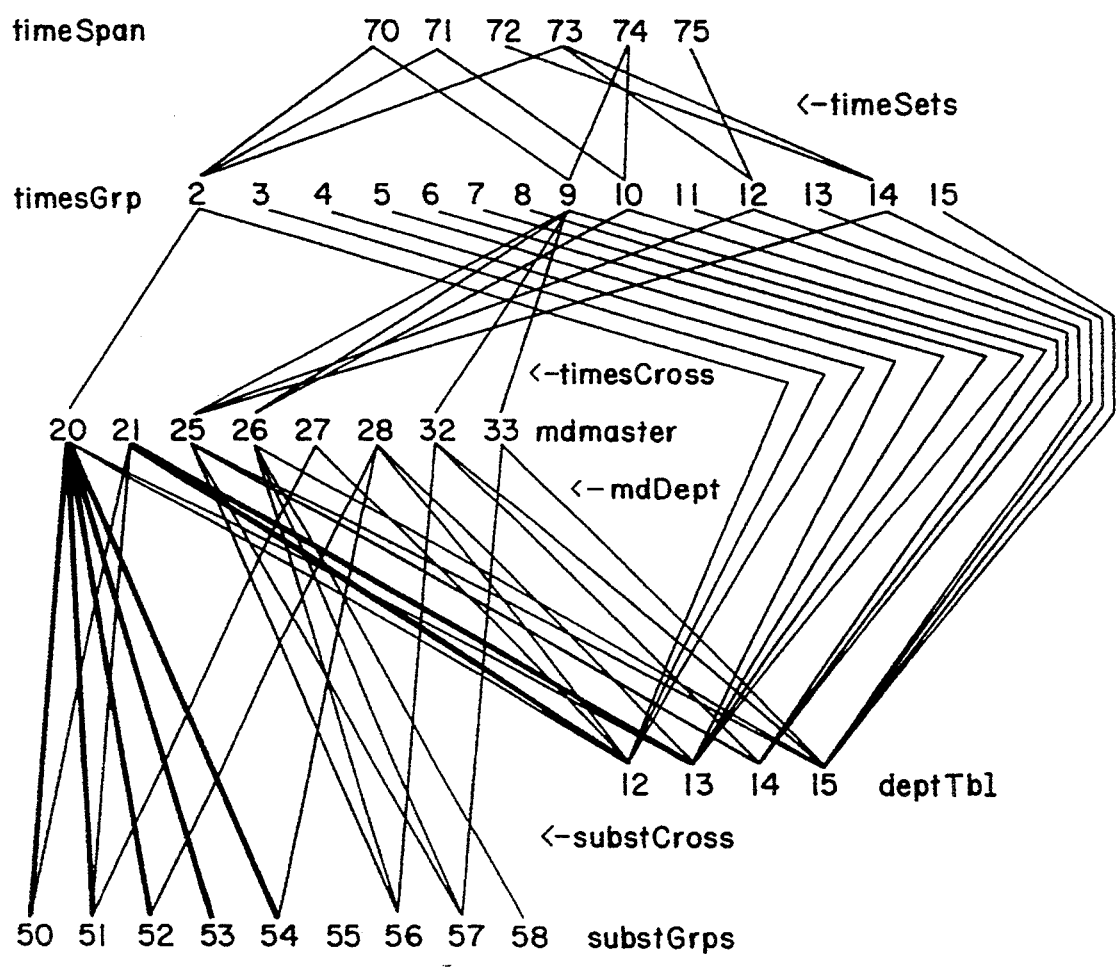
FIGS. 5($a$) and 5($b$) are views for showing how information displayed in FIGS. 4($a$) through 4($d$) is filtered based on targeted index information.

The pathing that results in the display of FIG. 4(b) is shown in FIG. 5(a). There, the five substitutable groups that are available for Dr. Brian Adams are shown by five heavy lines leading from the "mdmaster" row to the "substGrp" row. The two departments that Dr. John Baker is a member of are displayed by the two heavy lines leading from the "mdmaster" row to the "deptTbl" row.

In FIG. 4(c), the operator has queried the times groups for Dr. Jeremy Conrad. As indicated above, the times groups column does not display information from any table, but rather displays an indication of further structure within the interrelated tables, the structure being defined by the structural maps and pathing shown in FIG. 2. In accordance with a display map which will be defined more fully hereinbelow, when an operator queries an indication of structure such as the times group for Dr. Jeremy Conrad, a pop-down window appears. The pop-down window shows information about the times groups, but the information does not reflect all of the information available in the times group table. Rather, the information is filtered by the "Jeremy Conrad" entry whereby only time group information for Dr. Jeremy Conrad is displayed.

Figure 5B:
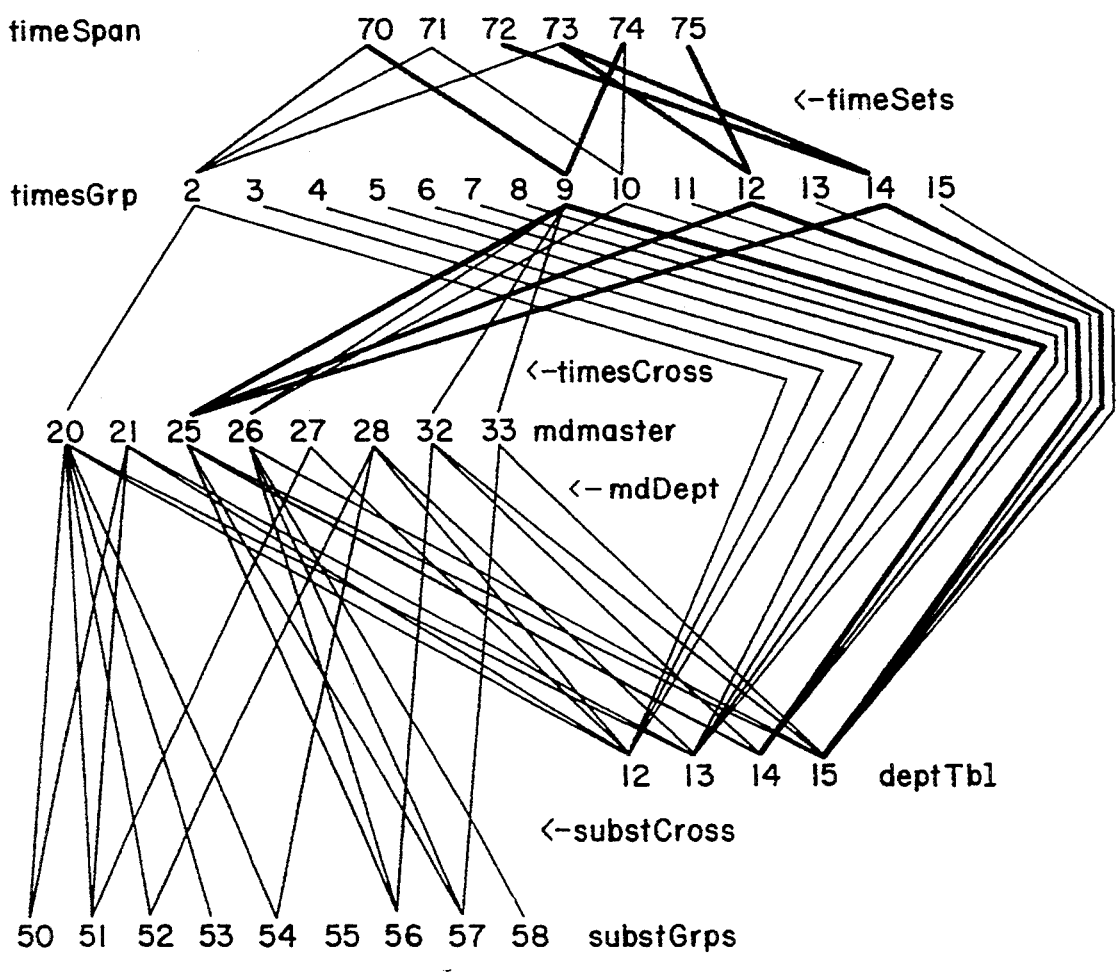

The pathing that results in the display of FIG. 4(c) is shown in FIG. 5(b). There, Dr. Jeremy Conrad ("25" in the mdmaster row) is shown to be a member of three times groups. Each of these times groups is displayed in FIG. 4(c). In addition, the departments associated with the time groups are displayed as well as the times of the time groups. These paths are shown in FIG. 5(b).

Reverting again to FIG. 4(c), it is seen that the pop-down window associated with Dr. Jeremy Conrad is the same in kind as the original window shown in FIG. 4(a). That is, the pop-down window can include either data from the table or an indication of further structure in the tables. Accordingly, the display process described above may be repeated indefinitely, as appropriate to the structure of the tables.

In FIG. 4(c), the times of each particular time group, such as the "RedIn" group have both a thumbscrew indication ")" and a pop-down menu indication "*". In response to query information from the operator, whereby the operator manipulates the thumbscrew indicator, information may be shown one at a time in the times column. Alternatively, as shown in FIG. 4(d), by targeting the pop-down menu indicator, the operator may obtain all information about the particular times group much as was done with respect to the departments for FIG. 4(b) above.

Once displayed, the structured information may be modified such as by editing entries, by adding and deleting entries, and by adding and deleting paths to entries. The manner and process for making the modifications are described more fully below in connection with the description of graphic presentations of structured data (FIGS. 15 through 24).

The display maps by which the foregoing display is made possible will now be explained with reference to FIGS. 6, 7 and 8 in which FIG. 6 is an example of a computer-readable structured map based on the graphic representation shown in FIG. 2, FIG. 7(a) is a definition of the basic elements of each display and designates the table from which information in the display is obtained as well as designating when structural indicators rather than tabular information is to be displayed, FIG. 7(b) defines the layout of FIG. 7(a) elements in windows that are available for operator display, and FIG. 8 is an operator selectable group display which allows an operator to select from any one of a different number of predefined displays.

Referring first to FIG. 6, it will be seen that a structural map in computer-readable form is provided by defining fields in each table that are equivalent to fields in other tables and consequentially act as join fields. The entries shown in FIG. 6 are a computer-readable form of the structured map shown graphically in FIG. 2. Thus, for example, the first entry in FIG. 6, namely mdmaster.mdnum mdDept.mdserial substCross.mdserial timesCross.docserial indicates that mdnum field 111 in mdmaster table 110, mdserial field 191 in mdDept table 190, mdserial field 182 in substCross table 180 and docserial field 161 in timesCross table 160 are all equivalent and consequentially act as join fields, all as shown in FIG. 2 and described above.

Referring now to FIGS. 7(a) and 7(b), those figures show what information is to be displayed, where the information is to be displayed, and whether to display information from the tables or an indication of further structure of the structural maps. FIG. 7(a) defines elements for use by FIG. 7(b). Each of the entries shown in FIG. 7(a) is a subgraph and provides a definition of the "chunks" of information that are to be displayed in response to query information from an operator. Thus, for example, the first entry in FIG. 7(a), which is "mdDept" defines a subgraph of information that is displayed in response to an operator query calling for a display of information organized by doctors. The entry at 210, namely Table Mdmaster.mdnum indicates that the doctor information table is a primary level table and that data is to be displayed from the doctor information table 110 based on information in the number field 111. The remaining entries indicate whether a simple (or regular) display of data is called for ("REG"), whether a composite display of regular data is called for ("REGCOMP"), whether a pop-down display of information is called for ("POP"), or whether a pop-down window showing additional structural information is called for ("POPWIN"). A regular display of data means that data from the listed field is displayed. A pop-down display indicates that multiple entries of information may be displayed by thumbwheel or pop-down windows, at the operator's choice. A pop-down window indicates that an information label, such as a text label or generic cursor symbol such as an icon, is displayed indicating that additional structural information may be obtained if the entry is targeted as described more fully hereinbelow.

Thus, for example, referring again to FIG. 7(a), the entries at 211 are regular entries calling for display of information stored in the listed field. All fields happen to be in the doctor information table 110 but this is not necessary. For example, one of the entries is Md_Lname REG "LAST" 15 char
    mdmaster.mdnum.md_Lname which defines a regular display of the name field 113 from the doctor information table 110. A unique name ("Md_Lname") is assigned to the field for reference purposes, and when displayed, the name field will be inserted into a character column 15 spaces wide which is labelled "LAST".

The entry at 212 is a pop-down display of data but the source of the data is not found in the doctor information table. Rather, as indicated at 212, the source of the data is found in the department table 150 and may be accessed by the join field defined in the structural maps shown in FIG. 2. In particular, the entry mdDept.mdserial.dept_no.→deptTbl.dept_no.dept_desc indicates that the department number field 192 in the mdDept table 190 should be accessed based on serial number field 191 which corresponds to the serial number field 111 in the doctor information table 110. Based on the CPU-stored structural maps in FIG. 6, CPU 11 knows that these fields join the two tables and that this access is possible. Based on the department number so obtained, the department table 150 is accessed via field 151 and the appropriate department name is obtained from field 152.

The pop-down windows at 214 do not display entries from the primary table but rather display information labels corresponding to data in secondary tables. It is only after the pop-down menus are targeted by operator query information that data from the tables is displayed. When CPU 11 encounters pop-down menus like those at 214 it simply displays the associated information label 215 which shows that additional structure is available and does not display the data from the tables. When the pop-down windows are targeted by an operator query, the data in the tables is displayed in accordance with the display maps. The pop-down display may include additional pop-down labels which refer to tertiary and beyond tables. Like the pop-down menus from the secondary tables, pop-down menus for tertiary tables do not display data, but rather display information labels for that data. The tertiary data is displayed only after the tertiary pop-down menus have been targeted.

Thus, for example, the entry at 215 indicates that the information label "TimesWin1" should be displayed rather than any entries from secondary tables.

The remaining part of 214 defines specifically the data that is to be displayed when the pop-down menu is targeted by operator query information. In particular, that entry reads Md_TGrps POPWIN Base TimesDef
Title "TimesWin1"
Filter (timeCross.docserial.time_id)
Layout Tm_Grp, Tm_Dept, Tm_Time The part of the entry entitled "filter" shows how displayed data is to be filtered. Specifically, as noted above, all of the information in the accessed table is not displayed but rather only information pertinent to the operator query is displayed. This is accomplished through filtering the data by a previous level of structure. In the case set out above, the only data filtered by the specific doctor in the specific times group, as defined in the "filter" statement will be displayed.

The remaining base definitions in FIG. 7(a) follow the above-described protocol. Each of the base definitions defines a display map whereby either information from tables is displayed or an indication of additional structure is displayed. In the case that data is displayed rather than a structural indication, the data is filtered by the immediately previous level of structure.

FIG. 7(b) shows how the base definitions are selected in accordance with specific windows. Specifically, these definitions show what base definition is displayed and what information from the base definition is displayed. The definitions additionally designate whether sorting is to take place (for example, sort by a doctor's name), and whether filtering should be performed.

FIG. 8 shows a menu of start-up options available to an operator. The menu shown in FIG. 8 shows the different windows that are available for operator selection in response to start-up query information.

In FIG. 8, the display described above with respect to FIGS. 4(a) through 4(d) may be obtained through operator selection of the menu item "3. * medical doctor *, md scheduable". Other displays may be obtained as shown, for example, in FIGS. 9, 11 and 13 and as described more fully below.

Thus, in response to operator selection of menu item "2. * department coverage *, dept cover", an operator will obtain a display such as that shown in FIG. 9(a). As seen there, department coverage is displayed in which each department is listed together with an associated pop-down window showing the times that the department is available.

FIG. 9(b) shows a situation in which, in response to operator query information, the third entry, namely "surgery, in-patient" has been targeted. The pop-down window is displayed, the information in the pop-down window being filtered by the index that defines the line, namely "surgery, in-patient". As described above, the pop-down window includes both information from the tables, such as group information, as well as thumbwheel indicators ")" showing that time information may be scrolled through and doctor information may be scrolled through as well. Further, as shown in FIG. 9(c), by targeting specific times or doctor's information, an operator may cause a pop-down window to be displayed showing all times or doctor's information that is available. As before, the information in the pop-down window is filtered by the index that defines the line, in this case the "RedIn" group.

Figure 10:
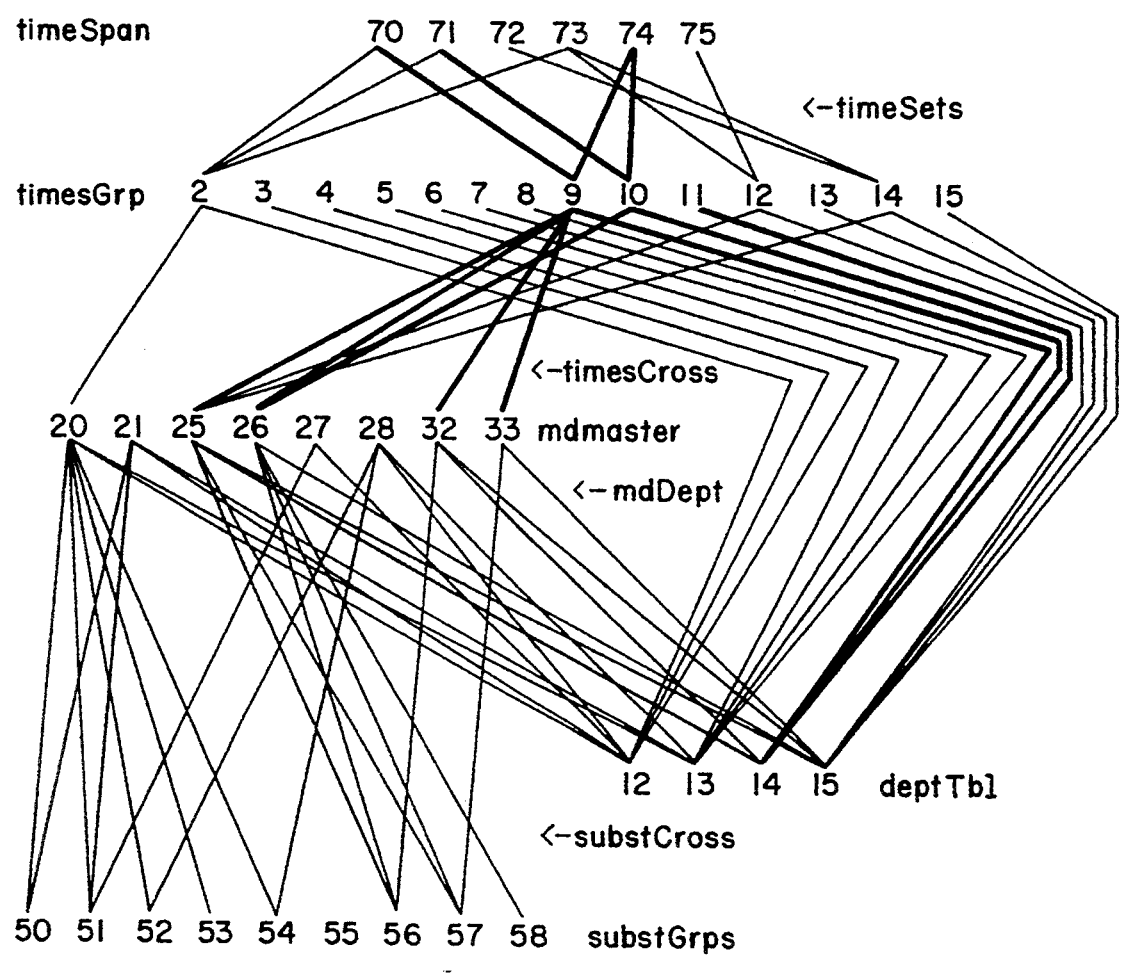
FIGS. 10, 12 and 14 are views for explaining how information is filtered in accordance with index information targeted in FIGS. 9, 11 and 13, respectively.

FIG. 10 shows pathing through the tables in the database in the situation shown in FIGS. 9(a) through 9(c). Specifically, in correspondence with targeting the "surgery, in-patient" department in the department table, all times groups stored in the times groups table for that department are displayed, together with the doctors for each times groups from the md master table 110 as well as the time spans from the time spans table 130.

Reverting again to FIG. 8, by selecting the menu item "2. * department assignments A *, dept.A", an operator may cause the display shown in FIG. 11(a) to be displayed. As seen there, and as described above, two types of information are displayed: either information directly from a table (in this case, for example, department information), as well as an indication of further structure in the tables (here, times groups). In response to operator query information targeting a particular department, such as the "surgery in-patient" department, a further window is popped down as shown in FIG. 11(b). The entries in the window are filtered by the index targeted by the operator. As shown in FIG. 11(b) the entries in the pop-down window include both information directly from the tables (group information) as well as further indications of further structure (doctor's information). As shown in FIG. 11(c), by targeting an entry in the group information, a further window is popped down. Again, the entries are filtered by the index targeted in the group information and they are also filtered by the index targeted in the department information. The new pop-down window includes information directly from the table (doctor's last name) as well as information from the table with an indication that further information can be displayed through operation of a thumb wheel or by popping down a further window as shown in FIG. 11(d).

Figure 12:
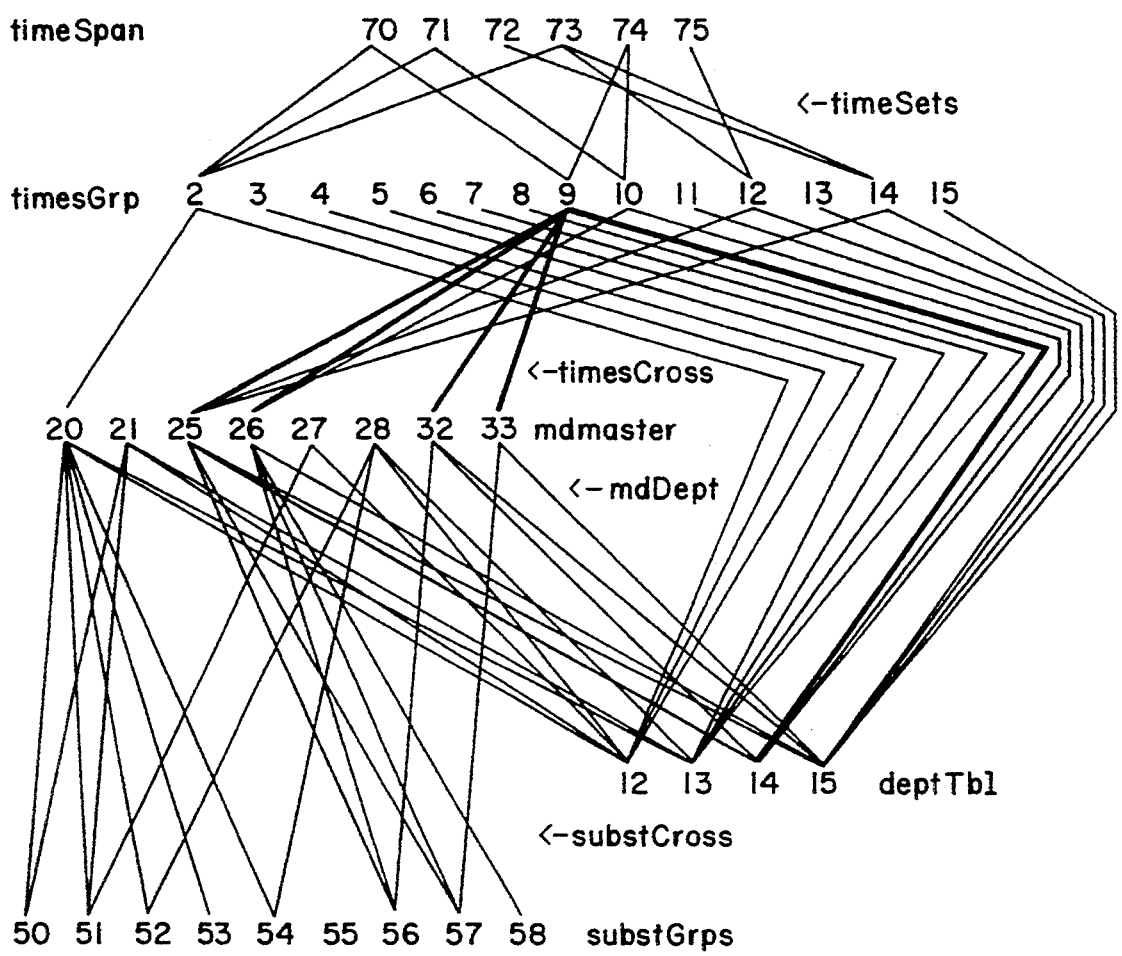

Pathing through the tables for the example shown in FIGS. 11(a) through 11(d) is shown in FIG. 12. As seen there, the doctors from the md master 110 table which are displayed in FIG. 11(c) are filtered through the targeted times group from the times group table 120 as well as the department from the department table 150.

Figure 14:
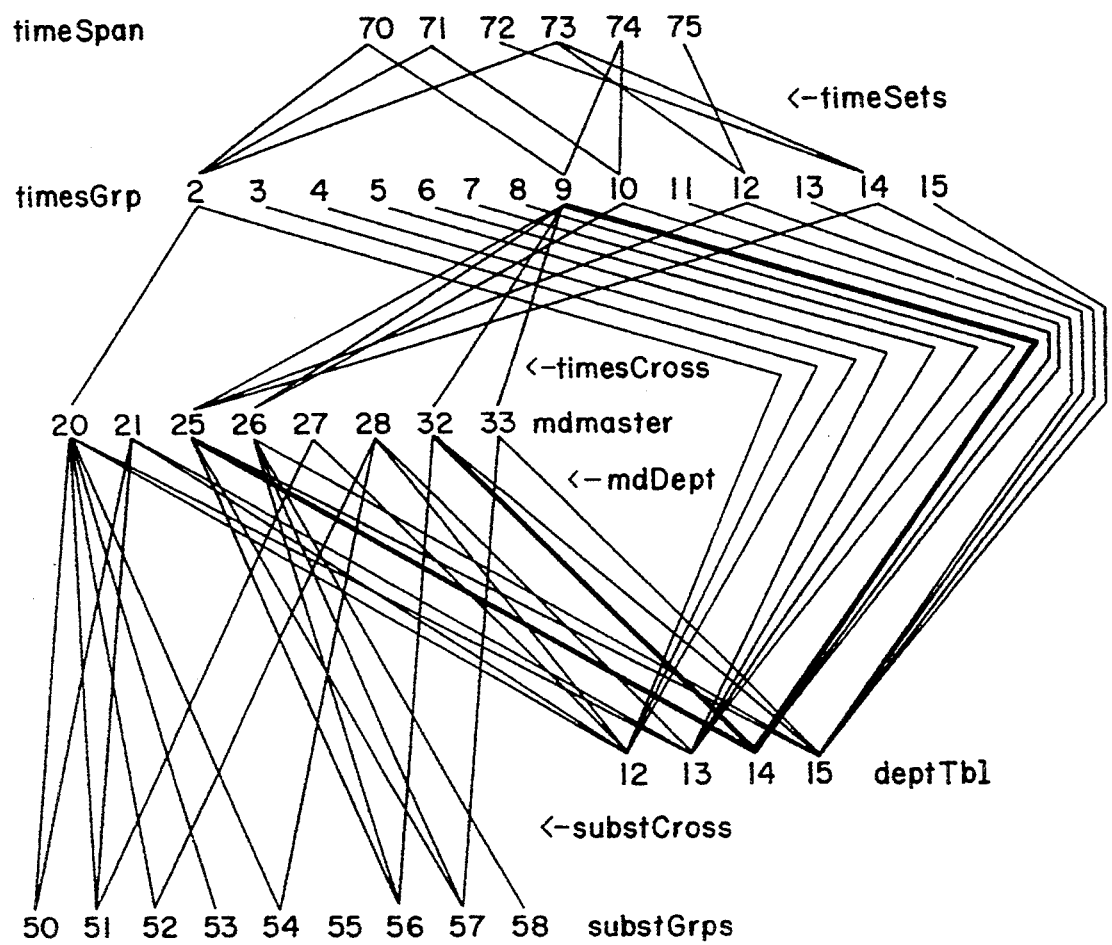

Reverting again to FIG. 8, by selecting the menu entry "2. * department assignment B *, dept.B" an operator may obtain the display shown in FIGS. 13(a) through 13(d). These figures correspond closely to those shown in FIGS. 11(a) through 11(d), respectively, and a detailed description is therefore omitted in the interest of brevity. It should be noted, however, that because of the difference in the windows definition from FIG. 7, the pathing through the information tables is different than that in FIG. 11 and therefore results in different information in the displays. For example, as shown in FIG. 14, which shows pathing through the tables, the doctors from the md master table 110 that are displayed in FIG. 13 are filtered through the targeted department from the department table 150 and the targeted times group from the times group table 120. Because these filters are ordered differently than in FIG. 12, however, the ultimate information obtained is different from that in FIG. 11.

In the foregoing examples, a tabular display has been utilized to present structured information to the operator. But a graphic representation of the database is also usable for viewing structure, adding paths, deleting paths, and deleting data and associated paths. The addition and modification of data is done by using editing facilities external to the graph.

FIG. 15 shows the structural and display information needed to display and manipulate the graph itself. The TableEquivDef sections show groups of database table names and index names that are equivalent, i.e., that are joins. This implicitly indicates those tables that are joined together. The ScreenNodeDef section shows information about the root database tables, i.e., those tables which have partition nodes as indices. The information includes a screen Title in quotation marks; the relevant index name; and a description of how the node values should be shown on the screen. For example, the table mdmaster is such a table; it will be referred to on the screen as "doctors". The index which defines nodes is mdnum in the mdmaster table; and the screen representation of each node value will be one character from md_Fname followed by one character from md_Lname (giving the MD's initials).

Figure 17:
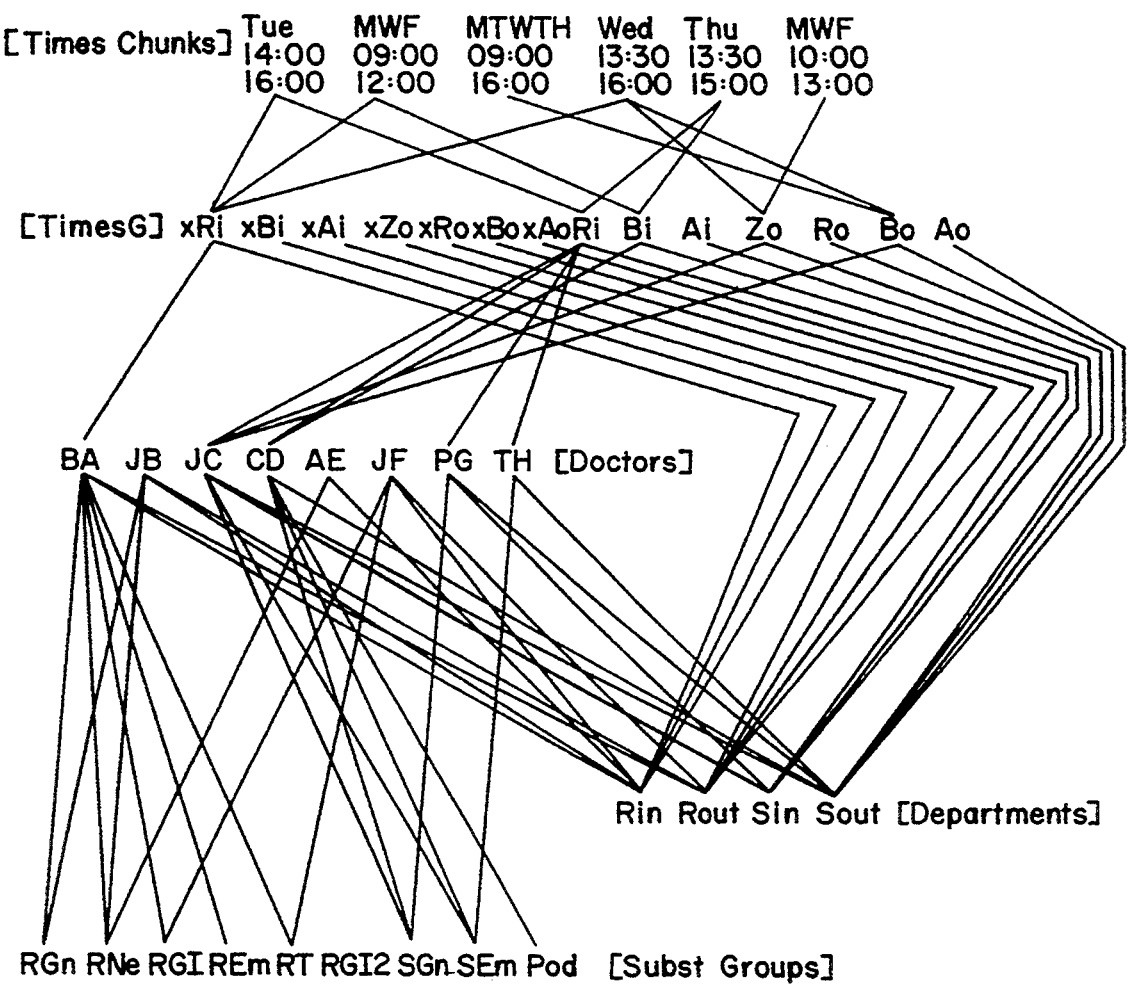
Figure 18:
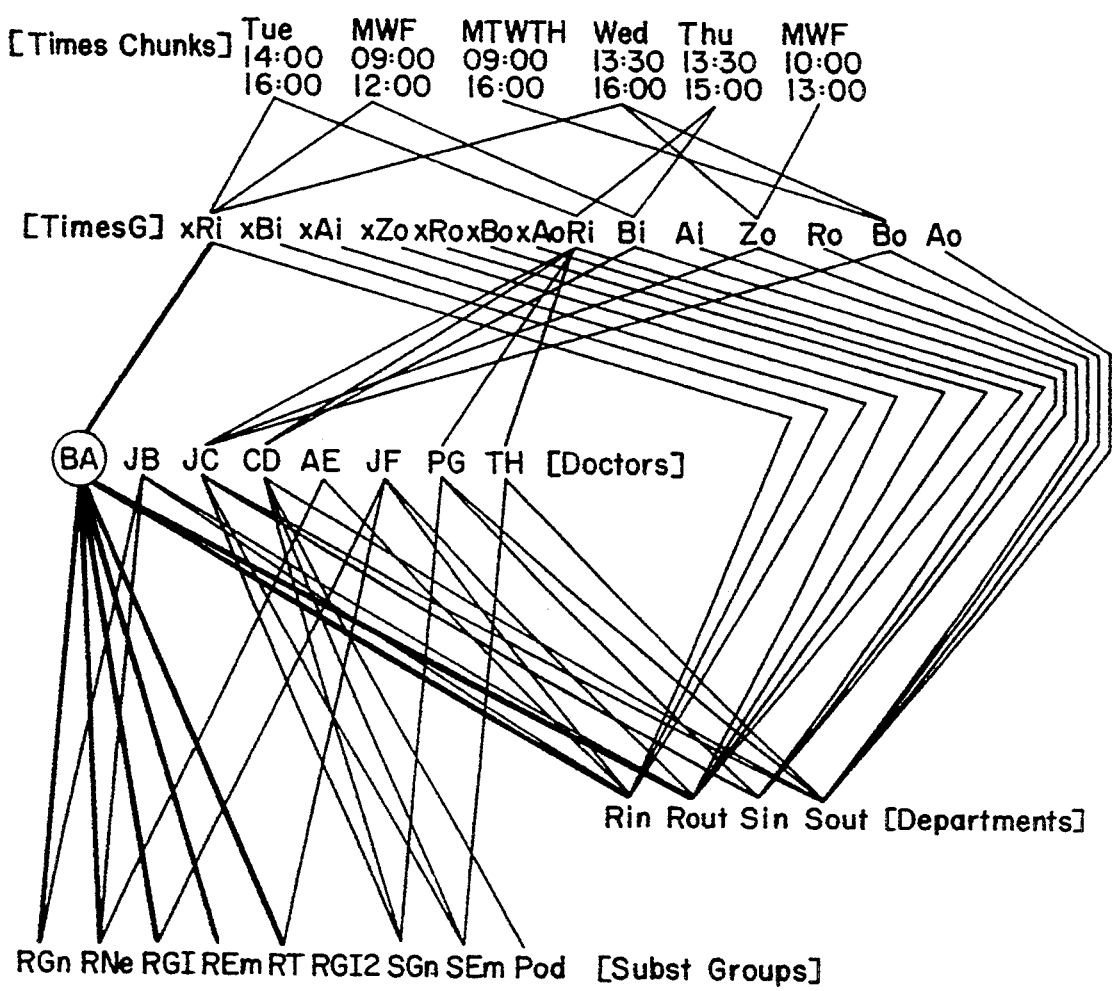
Figure 19:
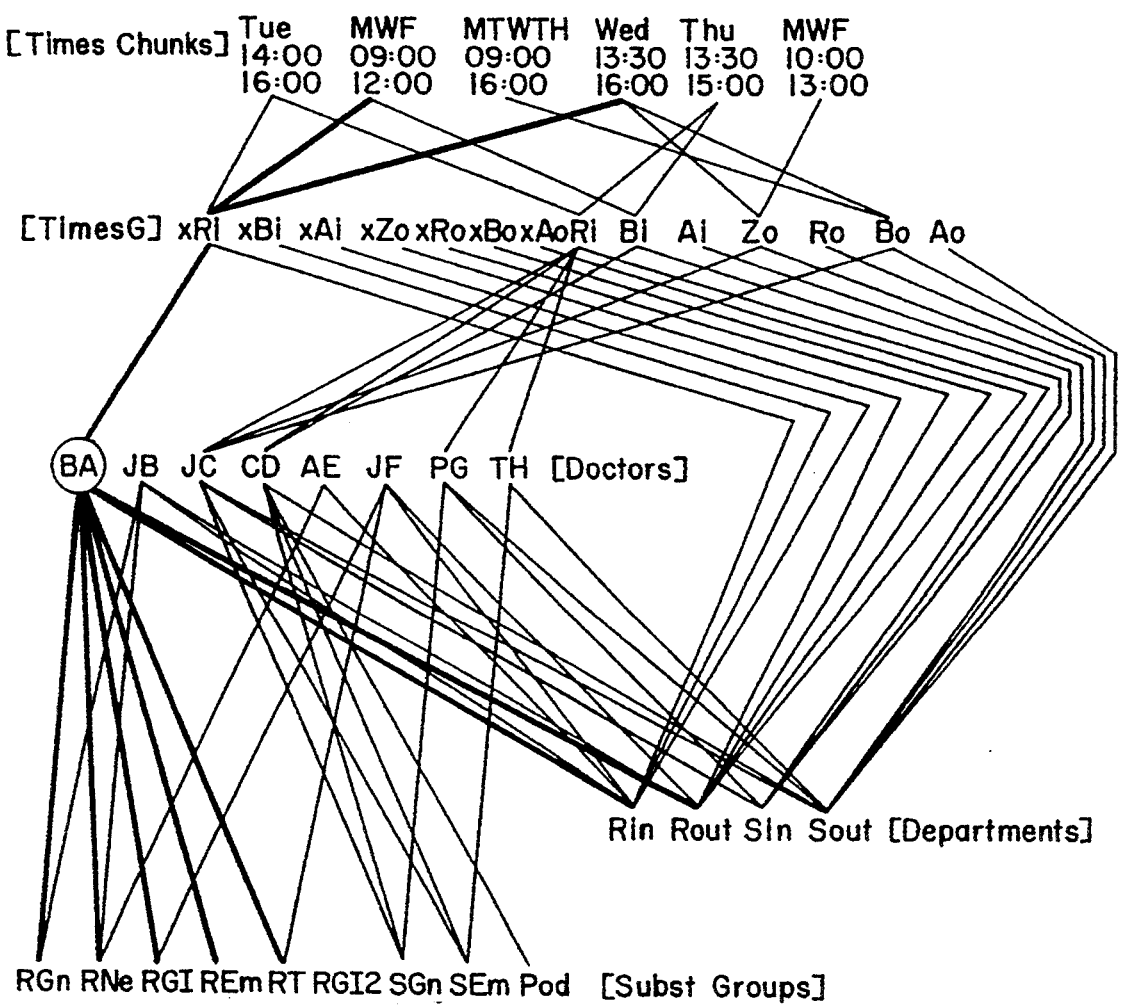
Figure 20:
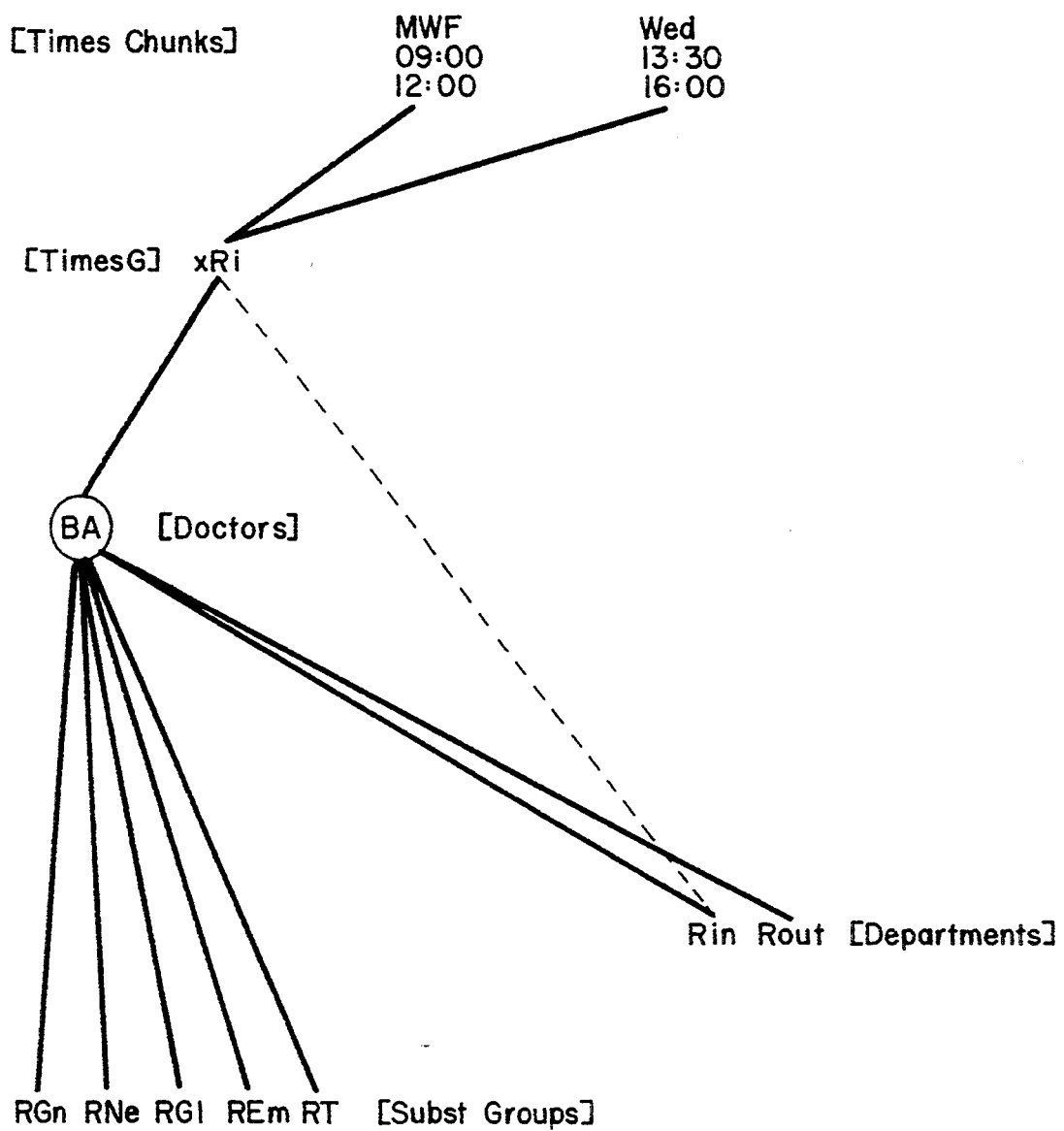

Initial display of the graph may be the graph structure only (FIG. 16(a)) or may be the full graph (FIG. 17). From each of these displays, the operator may expand or contract graph partitions between partition Titles (such as "Doctors") and node values (such as "BA", "JB", "JC", etc.). FIG. 16(a) shows a completely contracted graph structure. FIGS. 16(b) and 16(c) show the expansion of first TimesG nodes and then the Times Chunks nodes. When Titles are expanded to node values, a filter may be applied so that only some of the node values show. Node values, partition Titles, and paths may be moved around the screen or partition Titles, and paths may be moved around the screen or erased from the screen, without changing any data or logic. When Titles or node values are moved, connecting paths stretch or contract elastically, crossing as needed, to preserve the connections. Erasing from the screen is not the same as deleting, which will be discussed below. A specific node value may be chosen and all its immediately connected paths highlighted; the Doctor node BA has been chosen in FIG. 18. Other specific paths and nodes may be chosen and highlighted, such as those shown in FIG. 19. The operator may request the erasure of everything except a highlighted subgraph (FIG. 20). This erasure may occur with or without non-highlighted paths that exist between highlighted nodes; FIG. 20 shows such a path as a dotted line.

Figure 21:
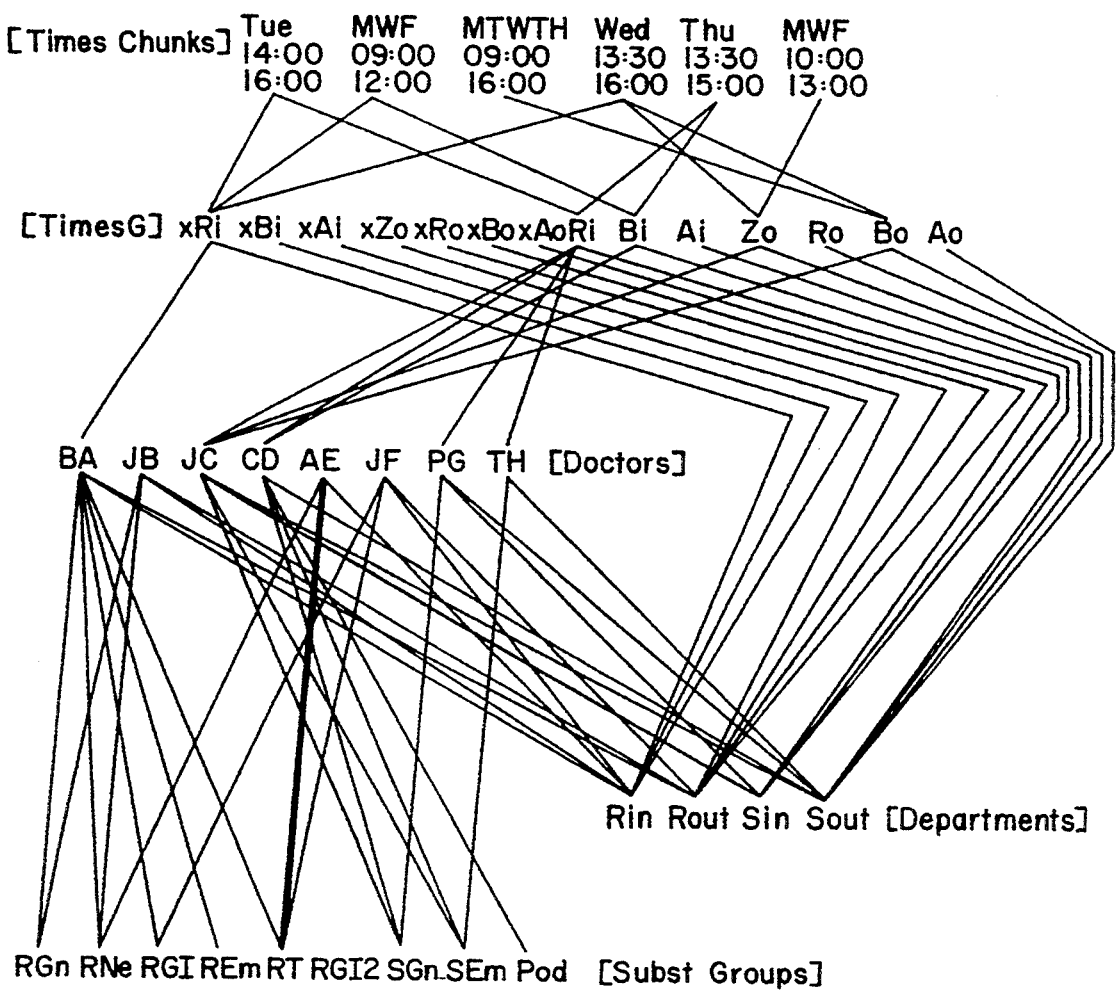

The operator may add paths between nodes that are in structurally related node partitions. FIG. 21 shows the addition of a path from AE in the "Doctors" partition to RT in the "Subst Groups" partition. This results in Andrew Egan becoming part of the Radiology, Teach group, and would be shown as such in any place that either node is shown.

Figure 22:
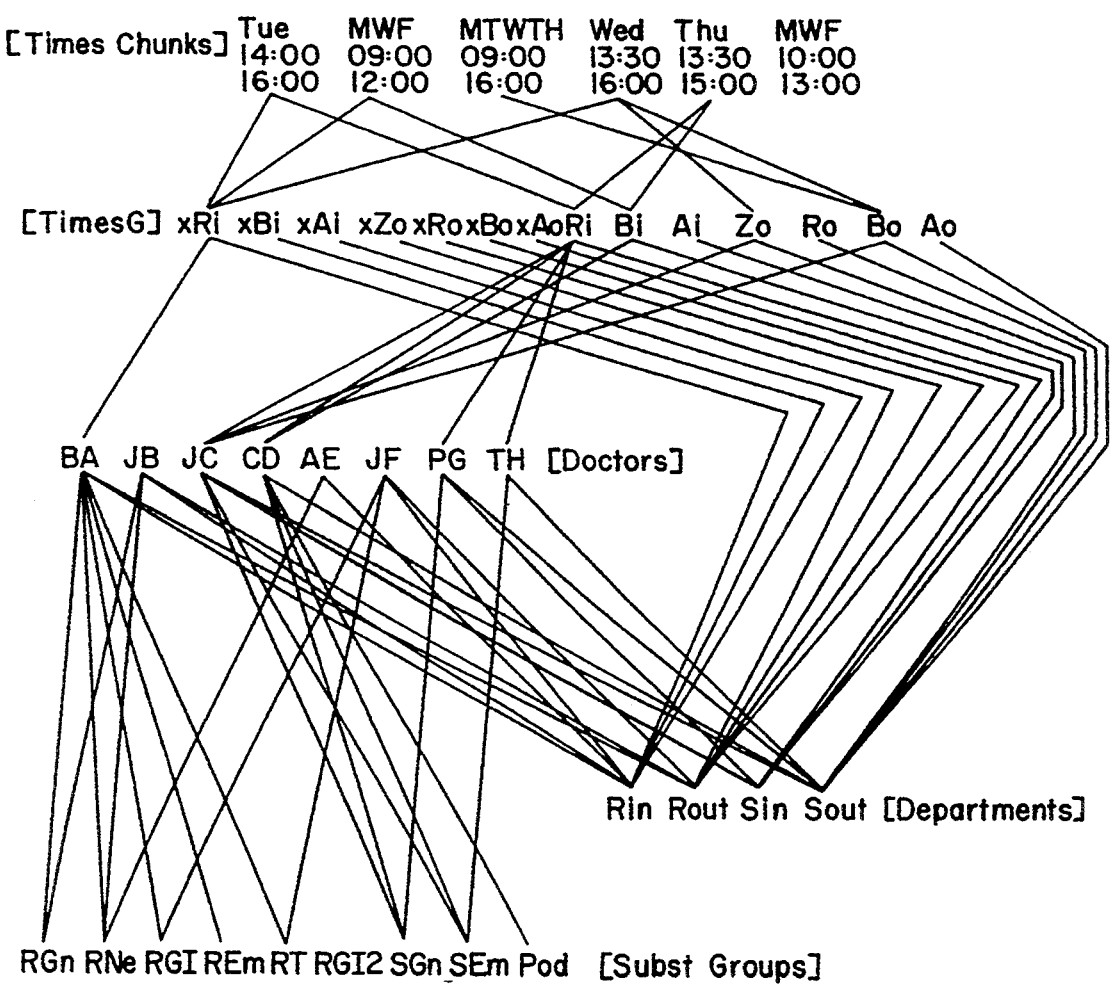

The operator may delete paths by indicating the path and requesting it to be deleted. FIG. 22 shows the deletion from FIG. 21 of the path from Zo to MWF 10:00 13:00, which results in the deletion of that Time Chunk from Time Group ZZZOut.

Figure 23:
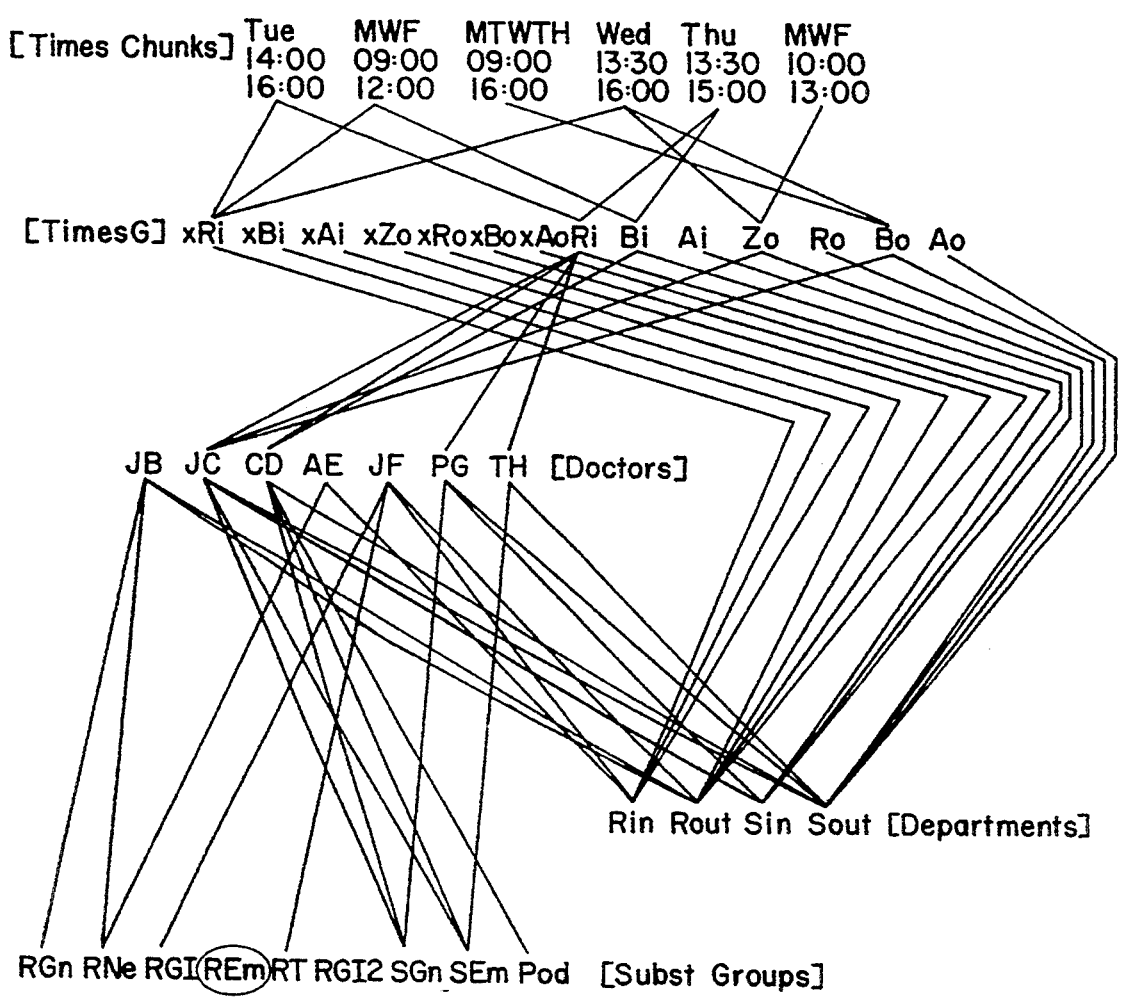

The operator may target (highlight) data and paths and then request deletion of the targeted items. Whenever a data node is deleted, all its connected paths are deleted; deletion never leaves dangling paths. The operator may request isolated nodes (i.e. nodes which have no paths to them) to be deleted; preferably such nodes are not deleted automatically. If isolated nodes remain, the operator may then path to them appropriately. FIG. 23 shows deletion from the highlighted data of FIG. 22, without the deletion of isolated nodes. The node that has become isolated because of the deletion is circled.

Figure 24:
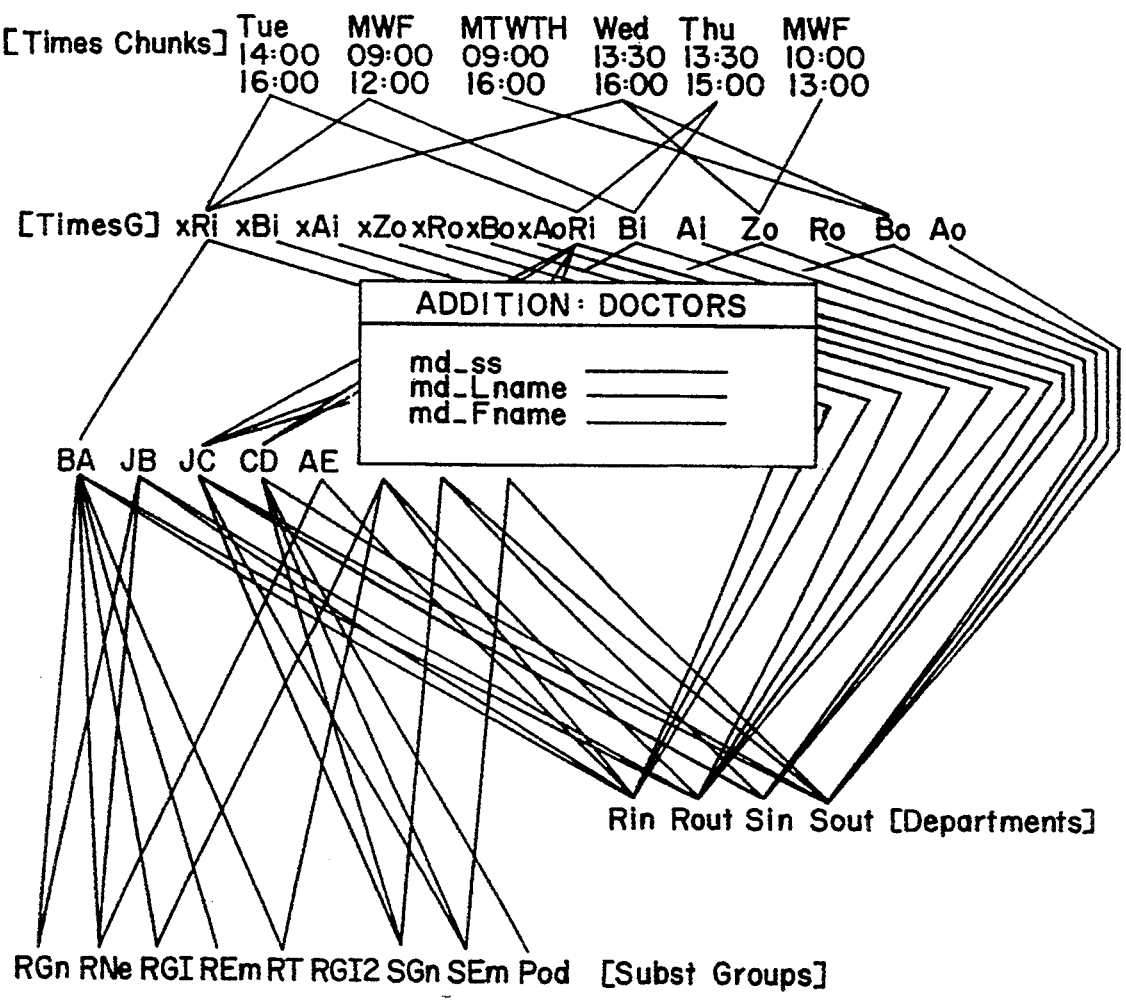
Figure 25A:
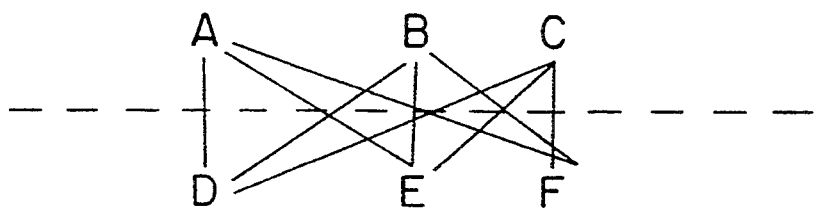
FIGS. 25($a$) through 25($c$) are views illustrating equivalent representations of structured information.
Figure 25B:
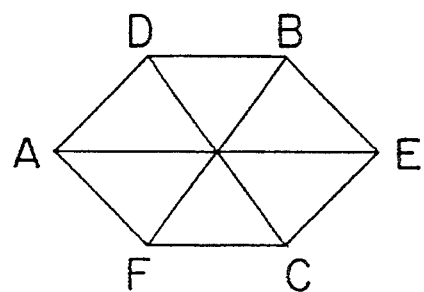
Figure 25C:
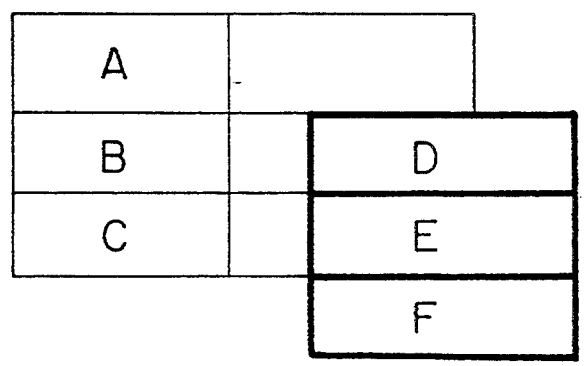

Data nodes are added by separate forms entry process. FIG. 24 shows an addition form for a Doctor. The example uses the table column names in the form, however operator defined form labels may also be used. Once the node has been added, it may be pathed to.

What is claimed is:

1. A method for displaying structured information formed from plural interrelated tables, the method comprising the steps of:

storing the plural interrelated tables such that each of the tables includes at least one join field which links that table to at least one other of the plural tables;

storing a structural map which, based on the join fields in the plural tables, describes interrelationships and pathing among the plural tables which form the structured information;

storing plural display maps, each said display map corresponding to one user-selectable display of information from the plural tables and defining the manner and placement of information on display means, each said display map including an information display part which designates which of the plural tables information for display is obtained from, and at least some of said display maps including a structural display part which designates when structural indicators rather than information from the plural tables is to be displayed; and displaying information from the plural tables in accordance with a user selection of one or more of said plural display maps, wherein, based on the information display part of the selected display map, information from designated ones of the plural tables is displayed on display means in the manner and placement defined by the selected display map, and wherein in the case where the selected display map includes a structural display part, a structural indicator in accordance with the structural map is displayed;

wherein when information is displayed the information is filtered in accordance with the interrelationships and pathing defined in the structural map such that not all information designated in the information display part of the selected display map is necessarily displayed.

2. A method according to claim 1, wherein in said displaying step, display is responsive to operator query information.

3. A method according to claim 2, wherein said displaying step comprises display by pop-down windows.

4. A method according to claim 3 in which the pop-down windows are superimposed over an existing display.

5. A method according to claim 4, wherein said display step comprises display information filtered by information targeted by operator query information.

6. A method according to claim 2, wherein said displaying step comprises display by graph.

7. A method according to claim 6, further comprising the step of highlighting paths in the graph.

8. A method according to claim 6, further comprising the step of fanning out the graph in response to operator query information.

9. A method according to claim 1, further comprising the step of modifying displayed information.

10. A method according to claim 9, wherein the structured information is dynamically updated based on the modification.

11. A method according to claim 1, further comprising the step of providing a menu of plural display maps, one of which is selectable based on operator query information.

12. A method according to claim 1, wherein the structured information comprises a multiple index multipartite graph and wherein the structural map comprises a representation of such a graph that is stored in a computer.

13. A method for displaying information from plural interrelated tables, each table including a join field which links that table to at least one other table, comprising the steps of:

defining a structural map that describes the interrelationships and pathing among the plural tables, the structural maps being based on the join fields that link the plural tables;

defining a multi-level display map for describing the manner and placement of information from the plural tables on display means, the display map including a first level which designates which information from the plural tables is displayed as well as where to display a structural indicator of further structure in the plural tables, and a second level which corresponds to the structural indicator and which designates which information from the plural tables is displayed in response to user selection of the structural indicator; and displaying, based on the display map, information from the plural tables mixed with the structural indicator, wherein in response to user selection of the structural indicator, information from the second level is displayed and it is filtered by a previous level of structure from the structural map.

14. A method according to claim 13, further comprising the steps of:

targeting displayed information; and displaying, based on the display map, information corresponding to the structure indexed by the information targeted in said targeting step.

15. A method according to claim 14, wherein information is targeted in response to operator query information.

16. A method according to claim 15, wherein said displaying step comprises display by pop-down windows.

17. A method according to claim 16, in which the pop-down windows are superimposed over an existing display.

18. A method according to claim 17, wherein said display step comprises display information filtered by information targeted by operator query information.

19. A method according to claim 14, wherein said displaying step comprises display by graph.

20. A method according to claim 19, further comprising the step of highlighting paths in the graph.

21. A method according to claim 20, further comprising the step of fanning out the graph in response to operator query information.

22. A method according to claim 13, further comprising the step of modifying displayed information.

23. A method according to claim 22, wherein information in the tables is dynamically updated based on the modification.

24. A method according to claim 13, wherein the tables are joined by join data and wherein the structural maps define pathing based on the join data.

25. A method according to claim 13, further comprising the step of providing a menu of plural display maps one of which is selectable based on operator query information.

26. A method according to claim 13, wherein each of the plural interrelated tables comprise a partition from a multiple index multipartite graph and wherein the structural map comprises a representation of such a graph that is stored in a computer.

27. An apparatus for displaying structured information formed from plural interrelated tables, comprising:

first storing means for storing the plural interrelated tables such that each of the tables includes at least one join field which links that table to at least on other of the plural tables;

second storing means for storing a structural map which, based on the join fields in the plural tables, describes interrelationships and pathing among the plural tables which form the structured information;

third storing means for storing plural display maps, each said display map corresponding to one user-selectable display of information from the plural tables and defining the manner and placement of information on display means, each said display map including an information display part which designates which of the plural tables information for display is obtained from, and at least some of said display maps including a structural display part which designates when structural indicators rather than information from the plural tables is to be displayed; and display means for displaying information from the plural tables in accordance with a user selection of one or more of said plural display maps, wherein, based on the information display part of the selected display map, the information from designated ones of the plural tables is displayed on the display means in the manner and placement defined by the selected display map, and wherein in the case where the selected display map includes a structural display part, a structural indicator in accordance with the structural map is displayed;

wherein when information is displayed the information is filtered in accordance with the interrelationship and pathing defined in the structural map such that not all information designated in the information display part of the selected display map is necessarily displayed.

28. An apparatus according to claim 27, wherein said information displayed by said displaying means is responsive to operator query information.

29. An apparatus according to claim 28, wherein said displaying means includes pop-down windows.

30. An apparatus according to claim 29, in which the pop-down windows are superimposed over an existing display.

31. An apparatus according to claim 30, wherein said displaying means displays information filtered by information targeted by operator query information.

32. An apparatus according to claim 28, wherein said displaying means comprises display by graph.

33. An apparatus according to claim 32, further comprising highlighting means for highlighting paths in the graph.

34. An apparatus according to claim 32, further comprising fanning means for fanning out the graph in response to operator query information.

35. An apparatus according to claim 27, further comprising modifying means for modifying displayed information.

36. An apparatus according to claim 35, wherein the structured information is dynamically updated based on the modification.

37. An apparatus according to claim 27, further comprising providing means for providing a menu of plural display maps one of which is selectable based on operator query information.

38. An apparatus according to claim 27, wherein the structured information comprises a multiple index multipartite graph and wherein the structural map comprises a representation of such a graph that is stored in a computer.

39. An apparatus for displaying information from plural interrelated tables, each table including a join field which links that table to at least one other table, comprising:

first storing means for storing a structural map that describes the interrelationships and pathing among the plural tables, the structural maps being based on the join fields that link the plural tables;

second storing means for storing a multi-level display map for describing the manner and placement of information from the plural tables on display means, the display map including a first level which designates which information from the plural tables is displayed as well as where to display a structural indicator of further structure in the plural tables, and a second level which corresponds to the structural indicator and which designates which information from the plural tables is displayed in response to user selection of the structural indicator; and displaying means for displaying, based on the display map, information from the plural tables mixed with the structural indicator, wherein in response to user selection of the structural indicator, information from the second level is displayed and it is filtered by a previous level of structure from the structural map.

40. An apparatus according to claim 39, further comprising:

targeting means for targeting displayed information; and displaying means displaying, based on the display map, information corresponding to the structure indexed by the information targeted by said targeting means.

41. An apparatus according to claim 40, wherein information is targeted in response to operator query information.

42. An apparatus according to claim 41, wherein said displaying means comprises display by pop-down windows.

43. An apparatus according to claim 42, in which the pop-down windows are superimposed over an existing display.

44. An apparatus according to claim 43, wherein said displaying means comprises display information filtered by information targeted by operator query information.

45. An apparatus according to claim 40, wherein said displaying means comprises display by graph.

46. An apparatus according to claim 45, further comprising a highlighting means for highlighting paths in the graph.

47. An apparatus according to claim 46, further comprising a fanning means for fanning out the graph in response to operator query information.

48. An apparatus according to claim 47, further comprising modifying means for modifying displayed information.

49. An apparatus according to claim 48, wherein information in the tables is dynamically updated based on the modification.

50. An apparatus according to claim 39, wherein the tables are joined by join data and wherein the structural maps define pathing based on the join data.

51. An apparatus according to claim 39, further comprising providing means for providing a menu of plural display maps one of which is selectable based on operator query information.

52. An apparatus according to claim 39, wherein each of the plural interrelated tables comprises a partition from a multiple index multipartite graph and wherein the structural map comprises or a representation of such a graph that is stored in a computer.

* * * * *

UNITED STATES PATENT AND TRADEMARK OFFICE
CERTIFICATE OF CORRECTION

PATENT NO. : 5,444,842
DATED : August 22, 1995
INVENTOR(S) : Sheridan Bentson, et al.

It is certified that error appears in the above-indentified patent and that said Letters Patent is hereby corrected as shown below:

ON THE TITLE PAGE ITEM [56],

"U.S. PATENT DOCUMENTS", insert:

```
--4,821,211   4/1989   Torres . . . . . . . . .   364/521
  4,982,344   1/1991   Jordan . . . . . . . . .   364/521--; and
```

ITEM [56],"OTHER PUBLICATIONS", insert:

--F.G. Halasz, et al., "NoteCards in a Nutshell", CHI & GI, 1987, pp. 45-52.

C.L. Foss, "Tools For Reading And Browsing Hypertext", Information Processing & Management, 1989, Vol. 25, No. 4, pp. 407-418.

N. Meyrowitz, "The Link To Tomorrow", UNIX Review, February, 1990, Vol. 8, No. 2, pp. 58-67.

J. Nielsen, "The Art Of Navigating Through Hypertext", Communications of the ACM, March, 1990, Col. 33, No. 3, pp. 298-309.

J. Fiderio, "A Grand Vision", BYTE, October 1988, pp. 237-268.--.

UNITED STATES PATENT AND TRADEMARK OFFICE
CERTIFICATE OF CORRECTION

PATENT NO. : 5,444,842
DATED : August 22, 1995
INVENTOR(S) : Sheridan Bentson, et al.

It is certified that error appears in the above-identified patent and that said Letters Patent is hereby corrected as shown below:

COLUMN 1:

Line 47, "is" should read --it--.

COLUMN 5:

Line 19, "unit 11" should read --unit 10--.

COLUMN 18:

Line 65, "comprise" should read --comprises--.

COLUMN 19:

Line 5, "on" should read --one--.

COLUMN 22:

Line 6, "or" should be deleted.

Signed and Sealed this

Twenty-sixth Day of November 1996

BRUCE LEHMAN

*Attest:*

*Attesting Officer*        *Commissioner of Patents and Trademarks*